(12) United States Patent
Park et al.

(10) Patent No.: US 9,844,059 B2
(45) Date of Patent: Dec. 12, 2017

(54) CONTROLLING RESOURCE USAGE FOR VEHICLE (V2X) COMMUNICATIONS

(71) Applicant: SHARP Laboratories of America, Inc., Camas, WA (US)

(72) Inventors: Kenneth James Park, Cathlamet, WA (US); John Michael Kowalski, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 15/468,925

(22) Filed: Mar. 24, 2017

(65) Prior Publication Data

US 2017/0280436 A1   Sep. 28, 2017

Related U.S. Application Data

(60) Provisional application No. 62/313,126, filed on Mar. 25, 2016.

(51) Int. Cl.
*H04W 72/04* (2009.01)
*G08G 1/16* (2006.01)
*H04L 29/08* (2006.01)

(52) U.S. Cl.
CPC .......... *H04W 72/048* (2013.01); *G08G 1/164* (2013.01); *H04W 72/0446* (2013.01); *H04L 67/12* (2013.01)

(58) Field of Classification Search
CPC . H04W 4/046; H04W 76/023; H04W 76/002; H04W 72/0446; H04W 72/048; H04W 84/18; H04W 84/005; H04W 84/12
(Continued)

(56) References Cited

U.S. PATENT DOCUMENTS

2005/0226275 A1   10/2005   Hrycaj et al.
2008/0169939 A1   7/2008    Dickens et al.
(Continued)

FOREIGN PATENT DOCUMENTS

KR   101333827 B1 * 11/2013

OTHER PUBLICATIONS

3GPP TR 22.863 V0.3.1; Technical Report, 3$^{rd}$ Generation Partnership Project; Technical Specification Group Services and System Aspects; Feasibility Study on New Services and Markets Technology Enablers—Enhanced Mobile Broadband; Stage 1 (Release 14) (Feb. 2016).
(Continued)

*Primary Examiner* — Keith Ferguson
(74) *Attorney, Agent, or Firm* — Nixon & Vanderhye P.C.

(57) ABSTRACT

A wireless terminal configured for use in a mobile vehicle comprises a transmitter (64), a receiver (66), and processor circuitry (42). The transmitter (64) is configured to transmit a series (50) of vehicle data messages (52) over a vehicle (V2X) communication radio interface (15). The receiver (66) is configured to receive a message (56) from a stationary infrastructure unit (36) over the vehicle (V2X) communication radio interface (15). The processor circuitry (42) is configured to: generate the vehicle data messages of the series (50); set a default transmission rate for transmission of at least some of the vehicle data messages of the series; make a determination regarding content of the message received from the stationary infrastructure unit (36); and thereafter, set in accordance with the determination, set a modified transmission rate for transmission of at least another vehicle data message of the series and thereby modify utilization of the vehicle (V2X) communication radio interface (15).

24 Claims, 17 Drawing Sheets

(58) Field of Classification Search
USPC ............ 455/509, 450, 344, 345, 422.1, 403, 455/426.1, 426.2, 466, 445, 507, 500, 455/517, 516, 550.1, 569.2; 370/310, 370/252, 312, 338, 328, 329
See application file for complete search history.

(56) References Cited

U.S. PATENT DOCUMENTS

| | | | |
|---|---|---|---|
| 2011/0125405 | A1 | 5/2011 | Blesener et al. |
| 2011/0298603 | A1 | 12/2011 | King et al. |
| 2012/0184321 | A1 | 7/2012 | Baldessari et al. |
| 2013/0279392 | A1 | 10/2013 | Rubin et al. |
| 2014/0229096 | A1 | 8/2014 | Carlson et al. |
| 2014/0263857 | A1 | 9/2014 | Huntimer et al. |
| 2014/0357193 | A1 | 12/2014 | Jose et al. |
| 2014/0370809 | A1 | 12/2014 | Jose et al. |
| 2014/0378054 | A1 | 12/2014 | Wang et al. |
| 2015/0117335 | A1 | 4/2015 | Jeng et al. |
| 2015/0126212 | A1 | 5/2015 | Karabinis |
| 2015/0302752 | A1 | 10/2015 | Holihan et al. |
| 2015/0310742 | A1 | 10/2015 | Albornoz |
| 2016/0036558 | A1 | 2/2016 | Ibrahim et al. |

OTHER PUBLICATIONS

3GPP TR 22.862 V0.3.1; Technical Report, $3^{rd}$ Generation Partnership Project; Technical Specification Group Services and System Aspects; Feasibility Study on New Services and Markets Technology Enablers—Critical Communications; Stage 1 (Release 14) (Feb. 2016).

3GPP TR 22.861 V0.3.1; Technical Report, $3^{rd}$ Generation Partnership Project; Technical Specification Group Services and System Aspects; Feasibility Study on New Services and Markets Technology Enablers for Massive Internet of Things; Stage 1 (Release 14) (Feb. 2016).

3GPP TR 22.891 V1.2.0; Technical Report, $3^{rd}$ Generation Partnership Project; Technical Specification Group Services and System Aspects; Feasibility Study on New Services and Markets Technology Enablers; Stage 1 (Release 14) (Nov. 2015).

3GPP TR 22.885 V14.0.0; Technical Report, $3^{rd}$ Generation Partnership Project; Technical Specification Group Services and System Aspects; Study on LTE Support for Vehicle to Everything (V2X) Services; (Release 14) (Dec. 2015).

3GPP TR 22.864 V0.3.1; Technical Report, $3^{rd}$ Generation Partnership Project; Technical Specification Group Services and System Aspects; Feasibility Study on New Services and Markets Technology Enablers—Network Operation; Stage 1 (Release 14) (Feb. 2016).

3GPP TSG-RAN WG2 Meeting #93, R2-161001, RAN2 Chairman (Intel), Proposed Agenda, St. Julian's, Malta, Feb. 15-19, 2016.

International Search Report and Written Opinion dated Jun. 16, 2017 in PCT Application No. PCT/US2017/24046.

* cited by examiner

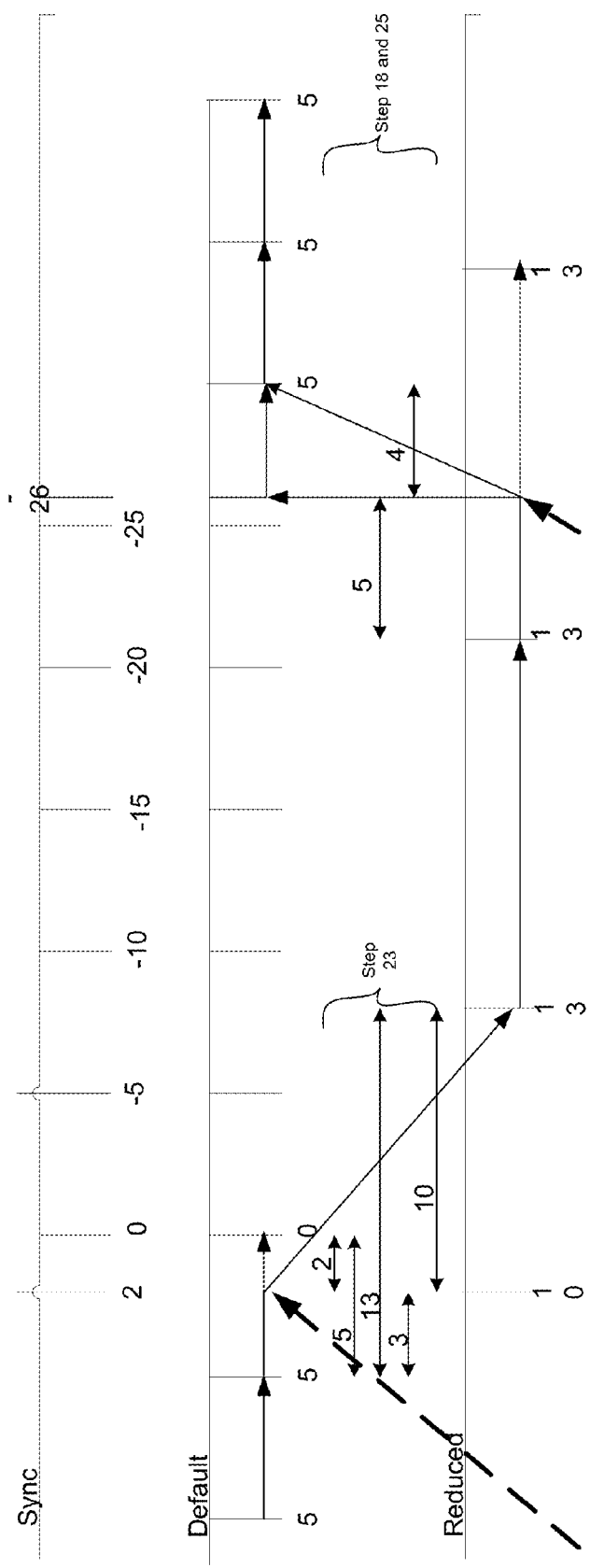

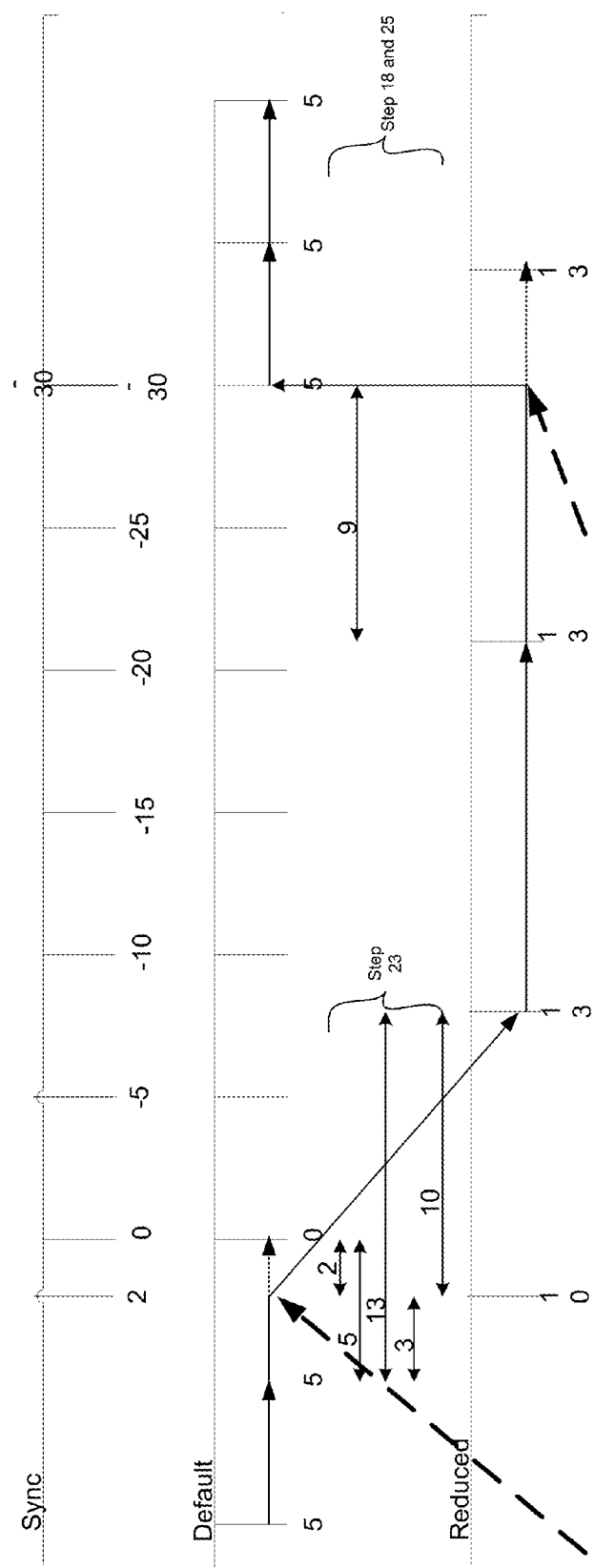

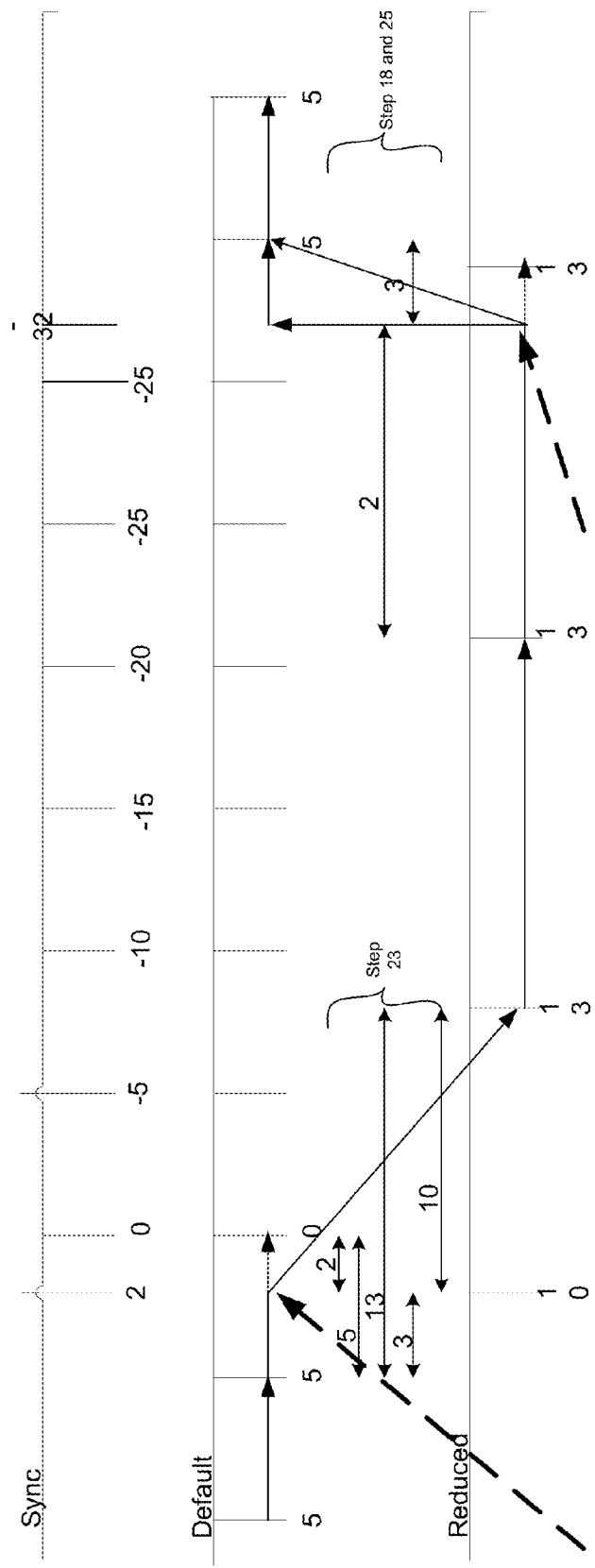

CONTROLLING RESOURCE USAGE FOR VEHICLE (V2X) COMMUNICATIONS

This application claims the priority and benefit of U.S. Provisional Patent Application 62/313,126, filed Mar. 25, 2016, entitled "CONTROLLING RESOURCE USAGE FOR VEHICLE (V2X) COMMUNICATIONS", which is incorporated herein by reference in its entirety.

TECHNICAL FIELD

The technology relates to wireless communications, and particularly to controlling communications over a vehicle (V2X) communication interface.

BACKGROUND

When two user equipment terminals (e.g., mobile communication devices) of a cellular network or other telecommunication system communicate with each other, their data path typically goes through the operator network. The data path through the network may include base stations and/or gateways. If the devices are in close proximity with each other, their data path may be routed locally through a local base station. In general, communications between a network node such as a base station and a wireless terminal is known as "WAN" or "Cellular communication".

It is also possible for two user equipment terminals in close proximity to each other to establish a direct link without the need to go through a base station. Telecommunications systems may use or enable device-to-device ("D2D") communication, in which two or more user equipment terminals directly communicate with one another. In D2D communication, voice and data traffic (referred to herein as "communication signals" or "communications") from one user equipment terminal to one or more other user equipment terminals may not be communicated through a base station or other network control device of a telecommunication system. "Device-to-device ("D2D") communication may also be known as "sidelink direct" communication (e.g., sidelink communication), or even as "sidelink", "SL", or "SLD" communication.

D2D or sidelink direct communication can be used in networks implemented according to any suitable telecommunications standard. A non-limiting example of such a standard is the 3rd Generation Partnership Project ("3GPP") Long Term Evolution ("LTE"). The 3GPP standard is a collaboration agreement that aims to define globally applicable technical specifications and technical reports for third and fourth generation wireless communication systems. The 3GPP may define specifications for next generation mobile networks, systems, and devices.

The 3GPP LTE-A system has specified a feature that provides for the support of efficient communications of small data objects between Transmit and Receive devices. Such LTE-A communication of small data objects between Transmit and Receive devices is known as Machine Type Communications (MTC). In this case, the transmitting device may be an eNB and the receiving data may be a UE, or vice-versa.

The 3GPP LTE-A system has also specified a feature that provides for the support of direct communications between transmit and receive devices, known as Proximity Services (ProSe). Proximity services consists of two main elements: network assisted discovery of transmit and receive devices that are in close physical proximity and the facilitation of direct communication between such transmit and receive devices with, or without, supervision from the network. Direct communication means a radio connection is established between the transmit and the receive devices without transiting via the network. This direct communication protocol is also known as the aforementioned sidelink. In direct communication, the transmitting device may be a user equipment (UE) and the receiving data may also be a user equipment.

Currently 3GPP is specifying a new feature for Rel-14 that covers use cases and potential requirements for LTE support for vehicular communications services (represented by the term, Vehicle-to-Everything (V2X) Services). The feature is documented in the TR 22.885 on LTE Study on LTE Support for V2X Services. The documents provide definitions for the following terms:

Road Side Unit: An entity supporting V2I Service that can transmit to, and receive from a UE using V2I application. RSU is implemented in an eNB or a stationary UE.

V2I Service: A type of V2X Service, where one party is a UE and the other party is an RSU both using V2I application.

V2P Service: A type of V2X Service, where both parties of the communication are UEs using V2P application.

V2V Service: A type of V2X Service, where both parties of the communication are UEs using V2V application.

V2X Service: A type of communication service that involves a transmitting or receiving UE using V2V application via 3GPP transport. Based on the other party involved in the communication, it can be further divided into V2V Service, V2I Service, V2P Service, and V2N Service.

The V2V service is intended to support use cases related to road safety. One such use case is known as collision avoidance. The collision avoidance use case provides that a first vehicle (equipped with a ProSe enabled UE that supports V2V services) may transmit from time-to-time or continuously information (e.g., a VDO transmission) about the vehicle including a vehicle unique identifier. In addition a second vehicle (also equipped with a ProSe enabled UE that support V2V services) may receive from time-to-time or continuously the VDO transmissions from the first vehicle. The second vehicle may analyze and compare the second vehicle's VDO to the VDO received from the first vehicle. The second vehicle may further determine if there is a probability that the two vehicles will occupy the same space at the same time in the near future.

What is needed are methods, apparatus, and/or techniques for controlling transmissions from mobile vehicles involved in vehicle (V2X) communications, such as for collision avoidance for example.

SUMMARY

In one of its aspects the technology disclosed herein concerns a wireless terminal configured for use in a mobile vehicle. The wireless terminal comprises a transmitter, a receiver, and processor circuitry. The transmitter is configured to transmit a series of vehicle data messages over a vehicle (V2X) communication radio interface. The receiver is configured to receive a message over the vehicle (V2X) communication radio interface. The processor circuitry is configured to: generate the vehicle data messages of the series; set a default transmission rate for transmission of at least some of the vehicle data messages of the series; make a determination regarding content of the received message received; and thereafter in accordance with the determination, set a modified transmission rate for transmission of at least another vehicle data message of the series and thereby modify utilization of the vehicle (V2X) communication radio interface.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 5A-FIG. 5D are diagrammatic views illustrating different scenarios of changing the value of a timer utilized in the message rate control algorithm of FIG. 4A-FIG. 4B.

DETAILED DESCRIPTION

Figure 1A:
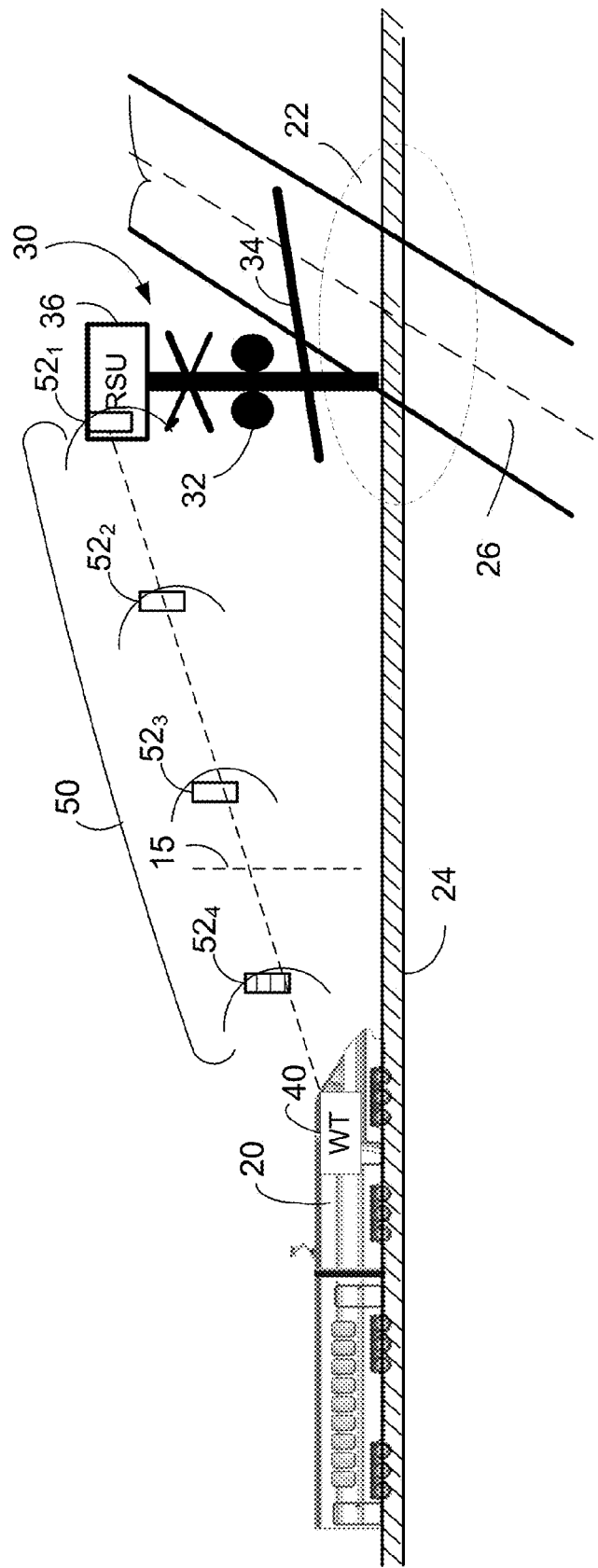
FIG. 1A is a diagrammatic view showing vehicle (V2X) communication between a representative moving vehicle and a stationary infrastructure unit and particularly showing transmission of at least some vehicle data messages of a series at a default transmission rate.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "device-to-device ("D2D") communication" may refer to a mode of communication between or among wireless terminals that operate on a cellular network or other telecommunications system in which the communication data traffic from one wireless terminal to another wireless terminal does not pass through a centralized base station or other device in the cellular network or other telecommunications system. The "device-to-device (D2D) communication" encompasses one or both of D2D signaling (e.g., D2D control information) and D2D data. "Device-to-device ("D2D") communication may also be known as "sidelink direct" communication (e.g., sidelink communication). The term "sidelink direct" may also be shortened to "sidelink", abbreviated as "SL", and as such "sidelink" may be used herein to refer to sidelink direct. Yet further, the term "ProSe" (Proximity Services) direct communication may be used in lieu of sidelink direct communication or device-to-device (D2D) communication. Therefore, it is to be understood that herein the terms "sidelink direct", 'sidelink" (SL), "ProSe" and "device-to-device (D2D)" may be interchangeable and synonymous.

Thus, as mentioned above, device-to-device (D2D) or sidelink direct communication differs from "WAN" or "Cellular communication" which is or involves communication between the base station and the wireless terminal. In device-to-device (D2D) communication, communication data is sent using communication signals and can include voice communications or data communications intended for consumption by a user of a wireless terminal. Communication signals may be transmitted directly from a first wireless terminal to a second wireless terminal via D2D communication. In various aspects, all, some or none of the control signaling related to the D2D packet transmission may be managed or generated by the underlying core network or base station. In additional or alternative aspects, a receiver user equipment terminal may relay communication data traffic between a transmitter user equipment terminal and one or more additional receiver user equipment terminals.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB") or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, 12, and thereafter), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

As used herein, vehicle (V2X) communication is a communication that involves a radio connection established between a transmit device and a receive device (e.g., a wireless terminal or UE), which radio communication does not transit via a base station node of the network, with at least one of the transmit and the receive devices being mobile, e.g., capable of being moved. Generic V2X encompasses one or more of vehicle to infrastructure (V2I) communication; vehicle to person/pedestrian (V2P) communication; and vehicle to vehicle (V2V) communication.

Figure 8:
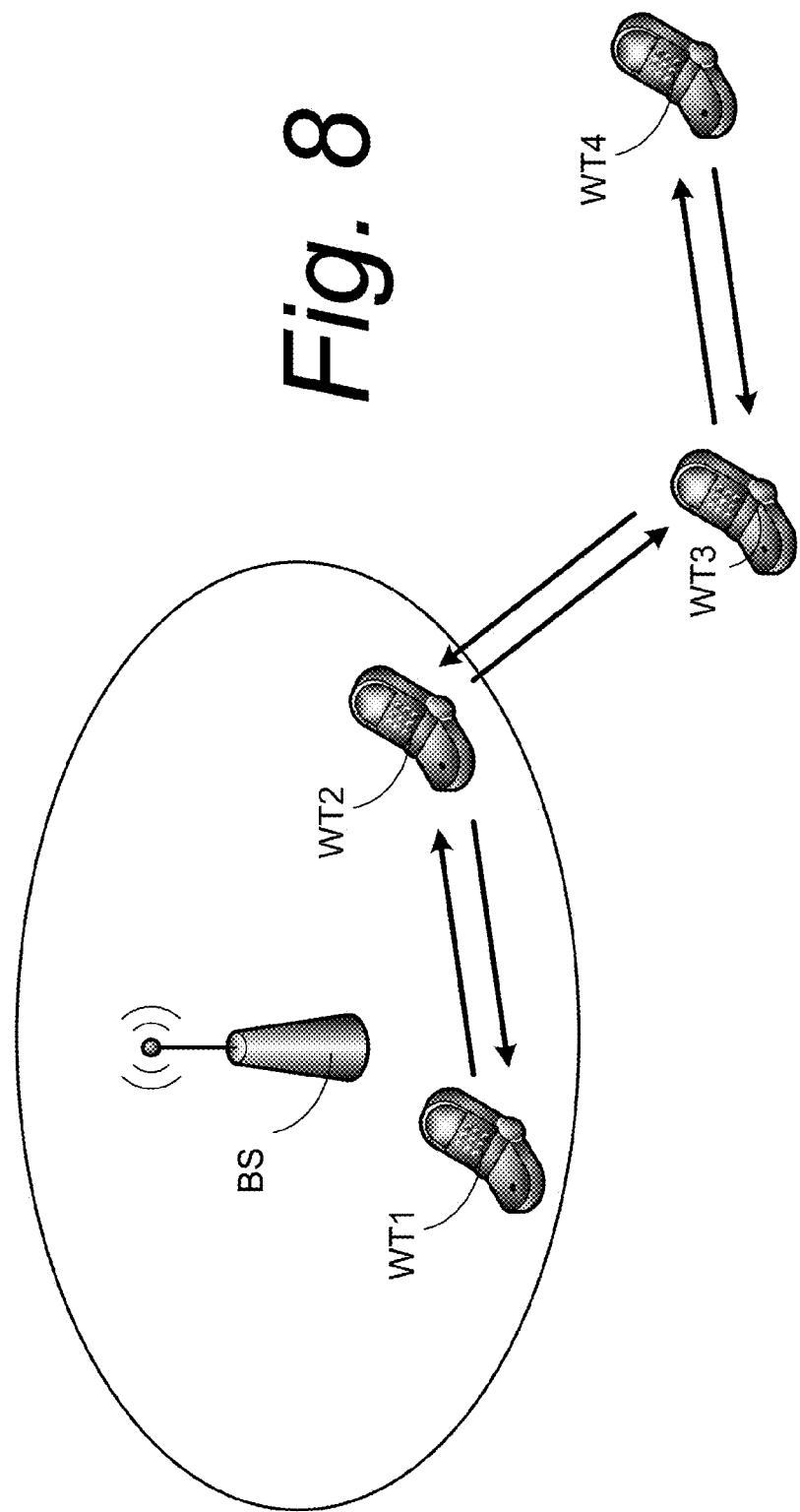
FIG. 8 is a diagrammatic view showing generally three scenarios which may occur in vehicle (V2X) communication, i.e., an in coverage vehicle (V2X) communication scenario; a partial coverage vehicle (V2X) communication scenario; and an out-of-coverage vehicle (V2X) communication scenario.

Generally, there are three general scenarios which may occur in vehicle (V2X) communication. Those three general vehicle (V2X) communications scenarios are illustrated in FIG. 8. A first vehicle (V2X) communication scenario is an "in coverage" vehicle (V2X) communication scenario, illustrated between WT1 and WT2 of FIG. 8, in which both WT1 and WT2 are within coverage of the radio access network. A second vehicle (V2X) communication scenario is a "partial coverage" scenario, illustrated between WT2 and WT3 of FIG. 8. In the "partial coverage" vehicle (V2X) communication scenario the wireless terminal WT2 is within coverage of the radio access network, but the wireless terminal WT3 is out-of-coverage of the radio access network. A third vehicle (V2X) communication scenario is an "out-of-coverage" scenario, illustrated between wireless terminal WT3 and wireless terminal WT4 of FIG. 8. In the out-of-coverage vehicle (V2X) communication scenario both the wireless terminal WT3 and the wireless terminal WT4 are out-of-coverage of the radio access network.

The three vehicle (V2X) communication scenarios are described with reference to whether or not a participating wireless terminals (e.g., WTs) are "in coverage" or "out-of-coverage" of one or more radio access networks (which may collectively be referred to as a "radio access network"). For sake of simplicity FIG. 8 depicts "coverage" as being with respect to an access node BS such as eNodeB which comprises a radio access network. It should be understood, however, that a wireless terminal may also be in coverage of the radio access network when served by any cell of the radio access network(s). For example, if wireless terminal WT1 and wireless terminal WT2 were served by different cells, when participating in vehicle (V2X) communication the wireless terminal WT1 and wireless terminal WT2 would still be in an "in coverage" vehicle (V2X) communication scenario.

Figure 9:
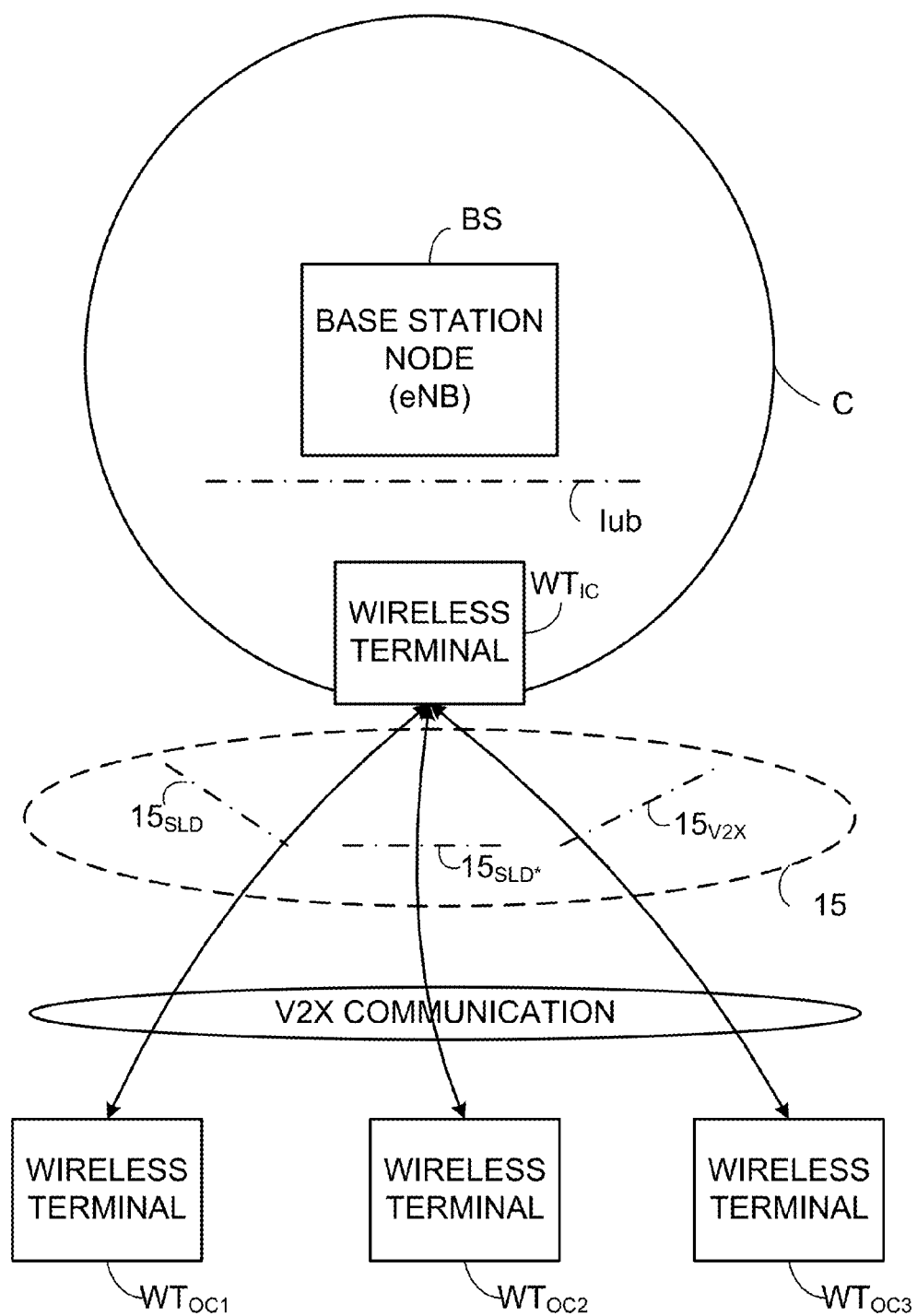
FIG. 9 is a diagrammatic view showing that, in differing implementations, V2X communication may be implemented either in conjunction with sidelink direct (SLD) communication, in conjunction with enhanced SLD, or apart from SLD as a separate V2X communication protocol.

As used herein and as illustrated in FIG. 9, V2X communication may be implemented in several ways. For illustrative context, FIG. 9 illustrates a base station node BS of a radio access network which serves a cell C. The base station BS may communicate with a wireless terminal $WT_{IC}$ which is in coverage of the radio access network over a radio interface Uu. FIG. 9 further shows that wireless terminal $WT_{IC}$ may engage in vehicle (V2X) communication with one or more other wireless terminals which are outside of coverage of the radio access network, particularly wireless terminal $WT_{OC1}$, wireless terminal $WT_{OC2,\ and}$ wireless terminal $WT_{OC3}$. It is assumed that either wireless terminal $WT_{IC}$, or all of wireless terminal $WT_{OC1}$, wireless terminal $WT_{OC2,\ and}$ wireless terminal $WT_{OC3}$ are mobile terminals for the communication to be vehicle (V2X) communication. Being "mobile" means that the wireless terminal is provided or situated in/with a mobile entity, such as a vehicle or a person.

As a first example implementation, V2X communication may be implemented using applications and resources of the type that were utilized for sidelink direct (SLD) communication (also known as device-to-device ("D2D") communication) before introduction of vehicle (V2X) communication. For example, when implemented as part of SLD communication the V2X communication may use resources and channels of the SLD communication scheme. In such first implementation the V2X communication may be said to be implemented using pre-V2X sidelink direct (SLD) protocol and over a pre-V2X sidelink direct (SLD) radio interface 15SLD.

As a second example implementation, V2X communication may be implemented using enhanced applications and enhanced resources utilized for sidelink direct (SLD) communication, e.g., sidelink direct communications augmented or enhanced with additional capabilities to accommodate vehicle (V2X) communication. In such second implementation the V2X communication may be said to be implemented using enhanced sidelink direct (SLD) protocol and over an enhanced sidelink direct (SLD) radio interface 15SLD*.

As a third example implementation, V2X communication may operate separately from sidelink direct (SLD) communication by, e.g., having separate and dedicated V2X communication resources and channels, and by being performed using application software which is specific to V2X communication. In such third implementation the V2X communication may be said to be implemented using separate vehicle (V2X) communications protocol and over a separate vehicle (V2X) communication radio interface 15V2X.

The fact that three example implementations are illustrated in FIG. 9 does not mean that a particular wireless terminal has to participate in all three or even two of the example implementations. FIG. 9 simply indicates the expansive meaning of the term vehicle (V2X) communication and that the technology disclosed herein encompasses vehicle (V2X) communication in all of its various existing and potential implementations.

As mentioned above, the V2V service is intended to support use cases related to road safety, such as (for example) collision avoidance. In fact, other aspects of vehicle (V2X) communication beyond V2V may be involved in collision avoidance, as explained herein. For example, if one vehicle is a train and the other is an automobile, the normal method for collision avoidance at a track and road intersection (a.k.a. "the intersection") has several possible aspects. First, there may be an automated gate that drops across the road to block the automobile from entering the intersection before, and during, the time that the train is occupying the intersection. Second, the train may generate a very loud, distinct and purposeful sound before, and during, the time that the train is occupying the intersection to warn any automobiles approaching the intersection that the train will be shortly, or is actively, occupying the intersection.

Described herein are apparatus, method, and technique for controlling V2X communications when promoting safety (e.g., collision avoidance) of trains and automobiles. In accordance with one aspect of the technology disclosed herein, a specialized V2X transmission device known as a Road Side Unite (RSU) is deployed at (or in close proximity) to an intersection (e.g., a railroad and road intersection in the train/automobile example embodiment). Such an RSU is stationary and is associated with the intersection in question via location coordinates (e.g., latitude and longitude). In such a deployment, the RSU broadcasts a warning message from time-to-time or continuously containing at least a unique identifier of the RSU, and optionally a location of an intersection associated to the RSU, a warning message sequence number, time-of-Msg-Broadcast and an indication regarding the state of the intersection (e.g. "Available for automobile transit", or "NOT Available for automobile transit". As such, such message broadcast by the RSU may herein be referred to as a RSU Data Object (RDO).

As described herein, a RSU that receives a message from a V2X device may rebroadcast the information from the V2X device. The shared system resources facilitated by the communications protocol (either sidelink direct protocol or a vehicle (V2X) communication protocol) may be wasted if two V2X services (i.e. the train and the RSU) broadcast redundant data in the same local proximity. According to one aspect of the technology disclosed herein, a train's V2V device is able to regulate its VDO transmission rate when in the proximity of a RSU that is rebroadcasting the train's VDO. In so doing, the technology disclosed herein controls the VDO messages in order to prudently use communication resources and, where possible, avoid redundancy and excess communication traffic.

FIG. 1A shows a moving vehicle 20 traveling toward critical location 22. In the illustrated example of FIG. 1A, the moving vehicle is a railroad locomotive (e.g., "train 20") and the critical location is an intersection 22 of railway track 24 with another traffic path (e.g., a highway or street 26). The critical location is thus a geographical location at which vehicle collision may occur. While being illustrated and herein described in terms of train 20 as the moving vehicle 20 and street 26 as the other and intersecting traffic path, it will be understood that the other types of vehicles and other types of paths may be represented thereby.

As shown in FIG. 1A, stationary infrastructure unit 30 is situated proximate intersection 22, e.g., the intersection of railway track 24 and street 26. For the particular example embodiment illustrated in FIG. 1A, stationary infrastructure unit 30 takes the form of a railroad crossing station or semaphore and accordingly comprises, e.g., one or more warning indicators (e.g., warning lights 32) and a selectively closeable traffic-blocking gate 34. In other example embodiments the stationary infrastructure unit 30 may be other structure suitable for different types of critical locations.

In each example embodiment, stationary infrastructure unit 30 comprises stationary infrastructure communication unit 36. In the particular example embodiment shown in FIG. 1A, the stationary infrastructure communication unit 36 surmounts or is located atop of the stationary infrastructure unit 30. It will be appreciated that in this or other example embodiments the stationary infrastructure communication unit 36 may be located at other positions or altitudes. In view of the stationary infrastructure unit 30 of FIG. 1A being illustrated as a railroad crossing station situated at the intersection of a railway track 24 and street 26, the stationary infrastructure communication unit 36 is also referred to herein a "road side unit" (RSU).

FIG. 1A further shows that wireless terminal (WT) 40 is situated in or on train 20. The wireless terminal 40 may be any appropriate form of device, such as a UE (user equipment), wireless laptop, or a smart phone, for example. As shown in more detail in conjunction with FIG. 2, wireless terminal 40 comprises processor circuitry 42 which executes one or more vehicle (V2X) communication applications 44. Vehicle (V2X) communication is typically generically referred to as "V2X communications".

Whether implementing V2X communication in conjunction with sidelink direct (SLD) communication, with enhanced SLD, or apart from SLD as a separate V2X communication protocol, the wireless terminal 40 executes a vehicle to infrastructure (V2I) application 46 for communicating with stationary infrastructure unit 30. The V2X communication is transmitted and received over a radio interface which herein is generically referred to as the V2X communication radio interface 15. As understood from the foregoing, the V2X communication radio interface may (in the first example implementation) be the PC5 interface 15SLD used for sidelink direct communications, or an interface 15SLD* usable by an enhanced version of sidelink direct which accommodates features of vehicle (V2X) communication; or an entirely new radio interface 15V2X particularly established for vehicle (V2X) communications apart from sidelink direct.

Figure 2:
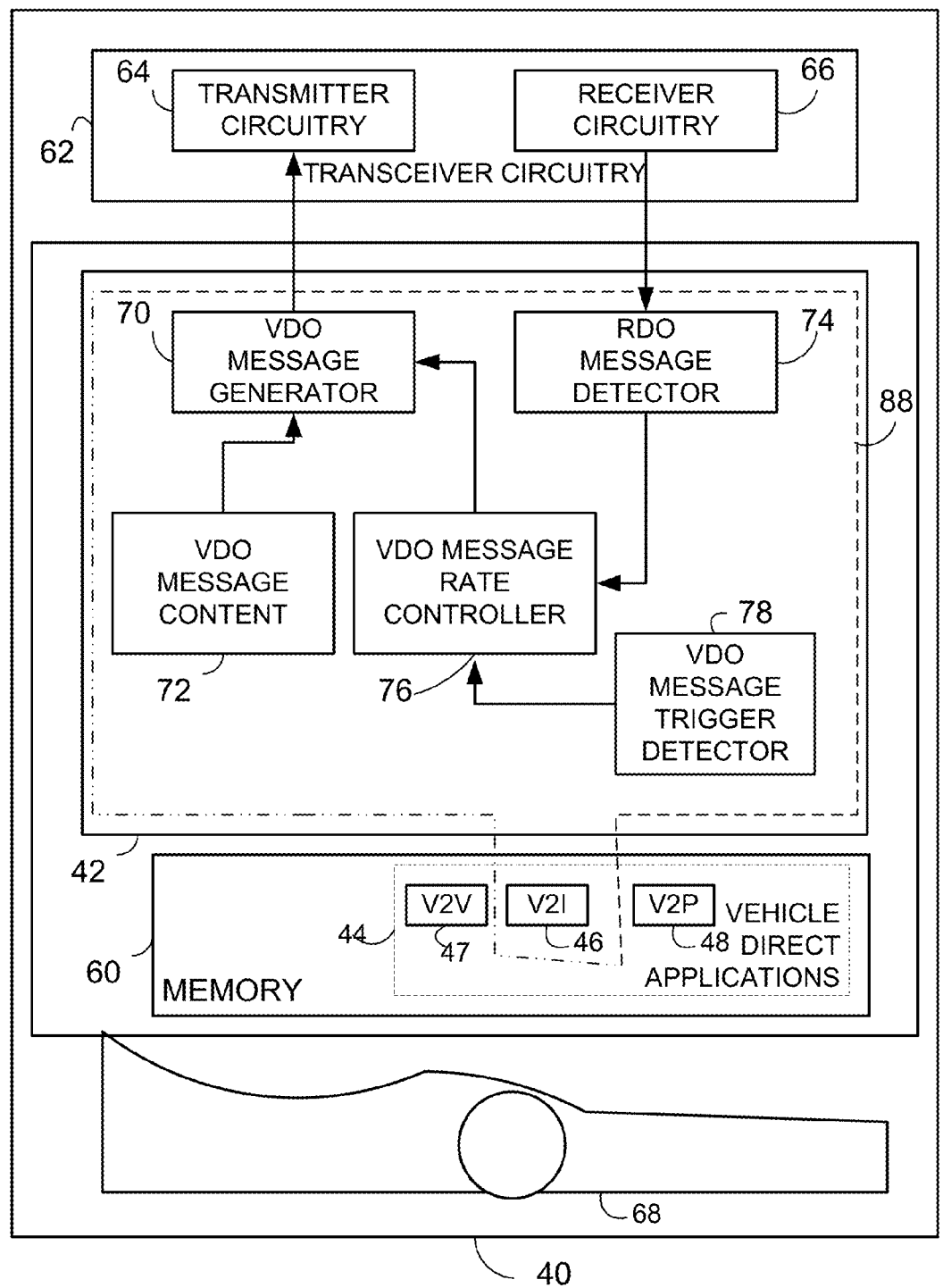
FIG. 2 is a schematic view of a wireless terminal suitable which controls transmission rate of vehicle data objects (VDOs) in vehicle (V2X) communications.

As shown in FIG. 2, the V2I application 46 comprises one of several possible vehicle (V2X) communication applications 44. In situations in which comparable techniques are performed with respect to a non-stationary communicant, e.g., another vehicle or a pedestrian, the acts described herein may instead be performed upon execution of another of the vehicle (V2X) communication applications 44.

FIG. 1A shows that, in conjunction with execution of V2I application 46, the wireless terminal 40 on train 20 transmits a series 50 of vehicle data messages 52, also known as vehicle data objects (VDOs) 52. The series 50 of vehicle data messages 52 are transmitted over the V2X communication radio interface depicted by broken line 15. FIG. 1A illustrates the series 50 as comprising vehicle data object (VDO) $52_1$ (the earliest or first VDO of series 50), a second vehicle data object (VDO) $52_2$, and third vehicle data object (VDO) $52_3$, and a fourth vehicle data object (VDO) $52_4$. The vehicle data objects (VDOs) 52 are shown as being generated and transmitted at a default transmission rate, represented by the relative spacing of the vehicle data objects (VDOs) 52. It so happens that the first or earliest vehicle data object (VDO) $52_1$ has reached and been received by the stationary infrastructure communication unit (RSU) 36 at the time shown in FIG. 1A.

Figure 1B:
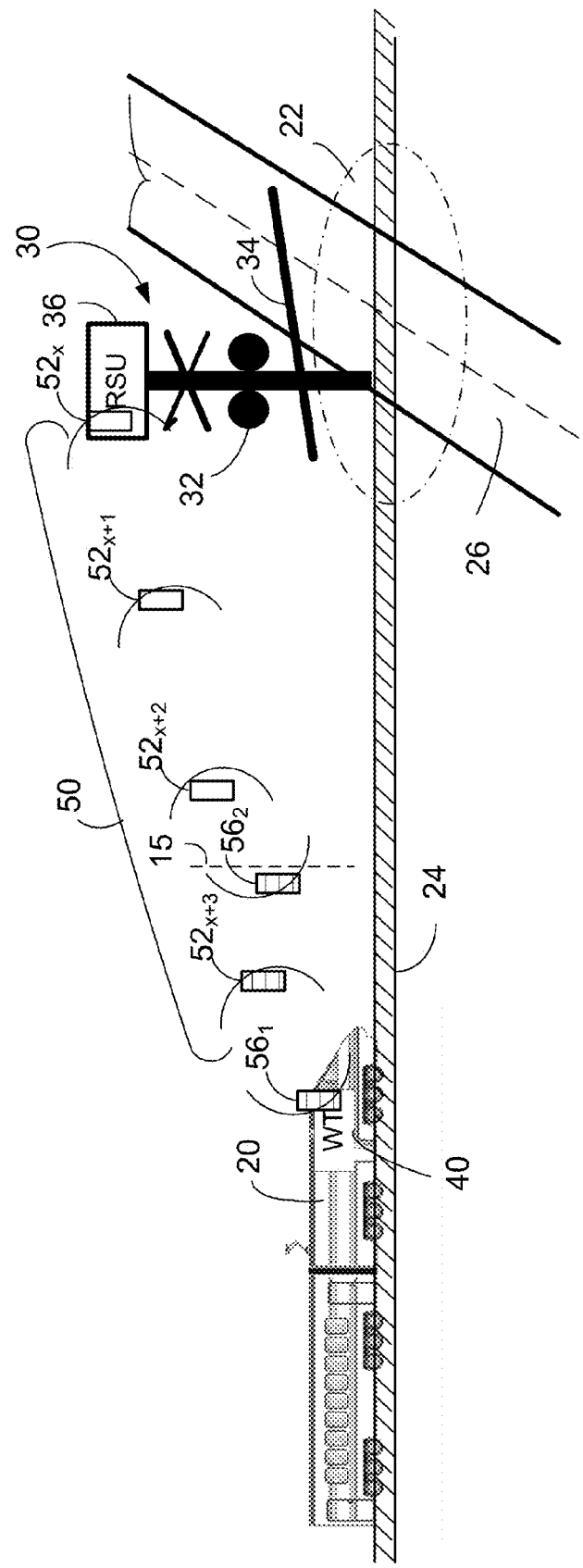
FIG. 1B is a diagrammatic view showing vehicle (V2X) communication between the moving vehicle and the stationary infrastructure unit of FIG. 1A and particularly showing transmission of a RDO message from the stationary infrastructure unit.

As shown in FIG. 1B, upon receiving a vehicle data object (VDO) 52 from train 20, the stationary infrastructure communication unit (RSU) 36 also transmits messages 56 over the V2X communication radio interface 15. A message transmitted by stationary infrastructure communication unit (RSU) 36 may be referred to as a RDO (roadside data object), e.g., RDO 56. An example RDO $56_1$ is shown has having been transmitted by stationary infrastructure communication unit (RSU) 36 and being now received by wireless terminal 40. For sake of illustration, another RDO $56_2$ is also shown in FIG. 1B, it being understood that other RDOs 56 may also be transmitted but are not illustrated for sake of simplification. At the time of FIG. 1B the wireless terminal 40 may being transmitting the vehicle data objects (VDOs) 52 at the default transmission rate. But, as explained below, whether wireless terminal 40 continues to transmit vehicle data objects (VDOs) 52 at the default rate depends on whether the wireless terminal 40 receives and detects an RDO 56 which includes some or all content of a vehicle data object (VDO) 52 already transmitted by wireless terminal 40. If, for example, the stationary infrastructure communication unit (RSU) 36 serves to rebroadcast some or all of the vehicle data objects (VDOs) 52, the wireless terminal 40 may be able to modify traffic over the V2X communication radio interface 15 by modifying (e.g., reducing) the transmission rate of the vehicle data objects (VDOs) 52. In most situations the modification may be a reduction of transmission rate, e.g., a reduction from the default rate to a slower transmission rate. However, in some situations, such as emergency situations, the wireless terminal 40 may desire to increase the transmission rate, e.g., from the default rate to an even faster rate.

Figure 3A:
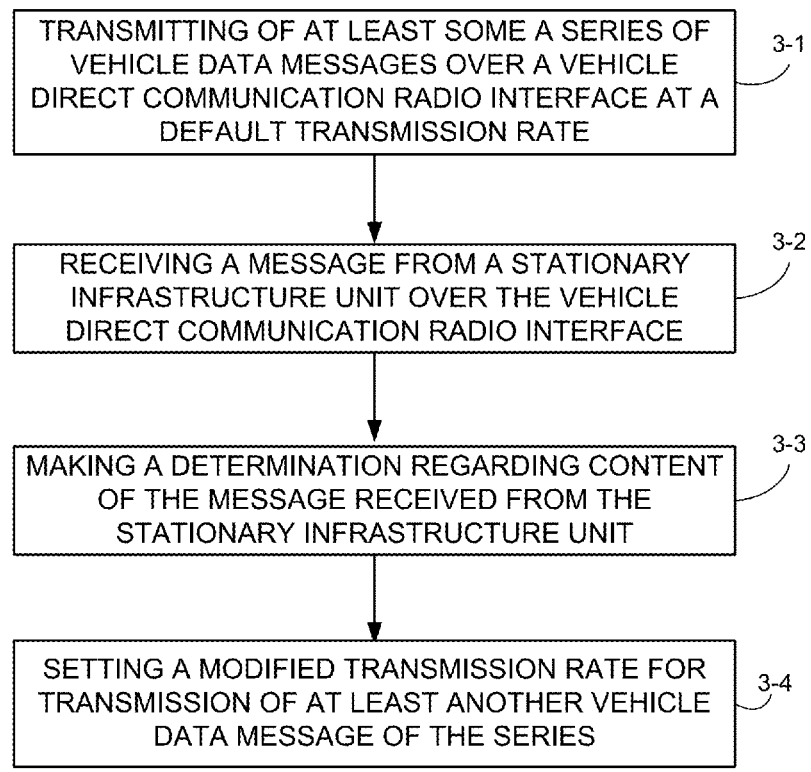
FIG. 3A is a flowchart depicting basic, example acts or steps involved in generic method of operating a wireless terminal which controls transmission rate of vehicle data objects (VDOs).

In the above regard, FIG. 3A shows basic acts or steps which may be performed by a wireless terminal 40 according to an example embodiment and mode, and particularly the processor circuitry 42 of wireless terminal 40. The basic method of FIG. 3A comprises acts 3-1 through 3-4 inclusive. Act 3-1 comprises the wireless terminal 40 transmitting at least some of a series 50 of vehicle data messages (VDOs 52) over the vehicle (V2X) communication radio interface 15 at a default transmission rate. Act 3-2 comprises the wireless terminal 40 receiving a message (e.g., RDO 56) from the stationary infrastructure unit 30 over the vehicle (V2X) communication radio interface 15. Act 3-3 comprises the wireless terminal 40 making a determination regarding content of the message (e.g., RDO 56) received from the stationary infrastructure unit. Act 3-4 comprises the wireless terminal 40 thereafter, in accordance with the determination, setting a modified transmission rate for transmission of at least another vehicle data message of the series, and thereby modifying utilization of the vehicle (V2X) communication radio interface.

Act 3-3 may comprise determining that the content of the message (RDO 56) received from the stationary infrastructure unit is a substantial retransmission by the stationary infrastructure unit of one of the vehicle data messages (vehicle data objects (VDOs) 52) of the series. But the RDO 56 may not need to be a complete or identical retransmission of a vehicle data object (VDO) 52, since in an alternative example embodiment and mode act 3-3 may comprise determining that the content of the RDO 56 received from the stationary infrastructure unit 30 comprises an identifier of the mobile vehicle that transmitted the vehicle data messages of the series, e.g., an identifier of train 20.

Figure 1C:
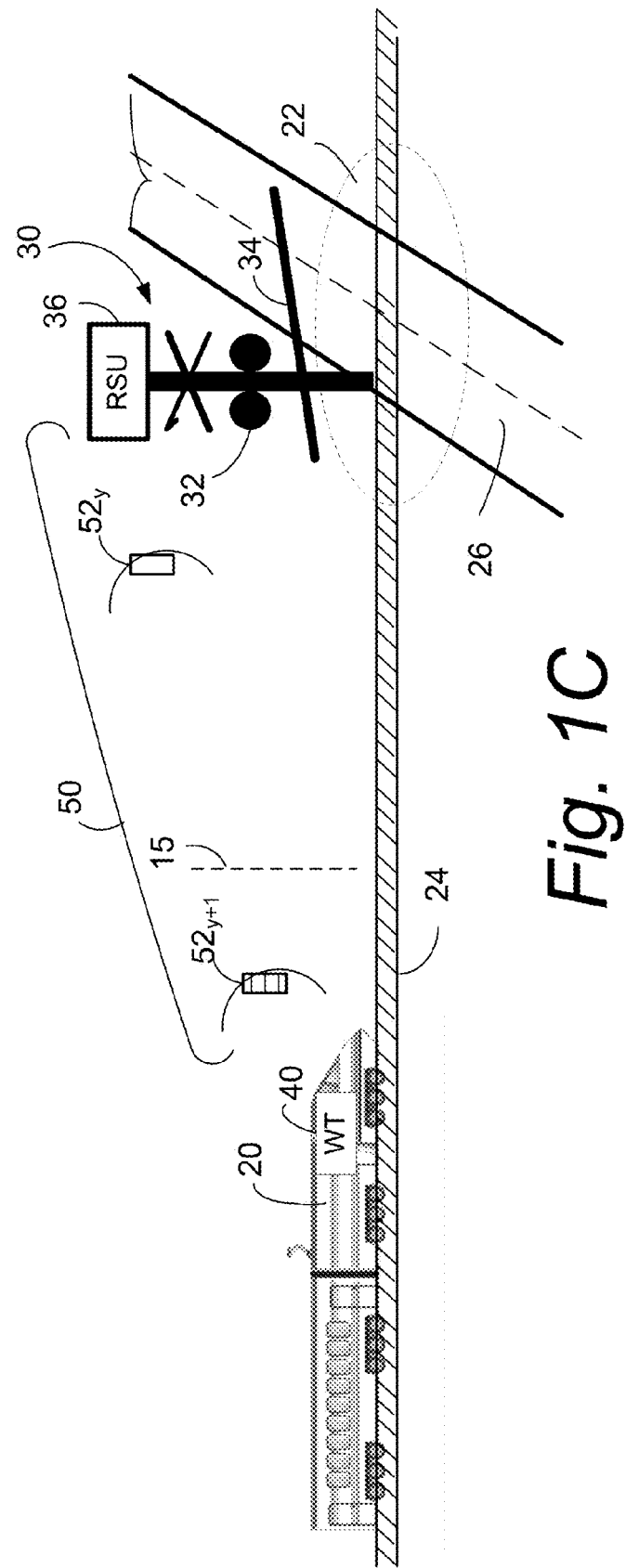
FIG. 1C is a diagrammatic view showing vehicle (V2X) communication between the moving vehicle and the stationary infrastructure unit of FIG. 1A at a point in time after receipt of a RDO message and particularly showing transmission of at least some of the vehicle data messages of the series at a modified transmission rate.

In an example embodiment and mode act 3-4 comprises setting the modified transmission rate to be a slower rate than the default transmission rate. The example embodiment and mode of setting the modified transmission rate for the vehicle data objects (VDOs) 52 at a slower rate than the default transmission rate is illustrated by FIG. 1C. It is presumed in the situation of FIG. 1C that the RDO $56_1$ was determined (at act 3-3) by wireless terminal 40 to include an identifier of train 20, and thus be a partial or complete retransmission by stationary infrastructure unit 30 of the vehicle data object (VDO) $52_1$. Thereafter, starting with vehicle data object (VDO) $52_j$, the wireless terminal 40 transmits at least some (e.g., some of the remaining) vehicle data objects (VDOs) 52 of series 50 of vehicle data messages 52 at the modified (e.g., slower) transmission rate.

Figure 3B:
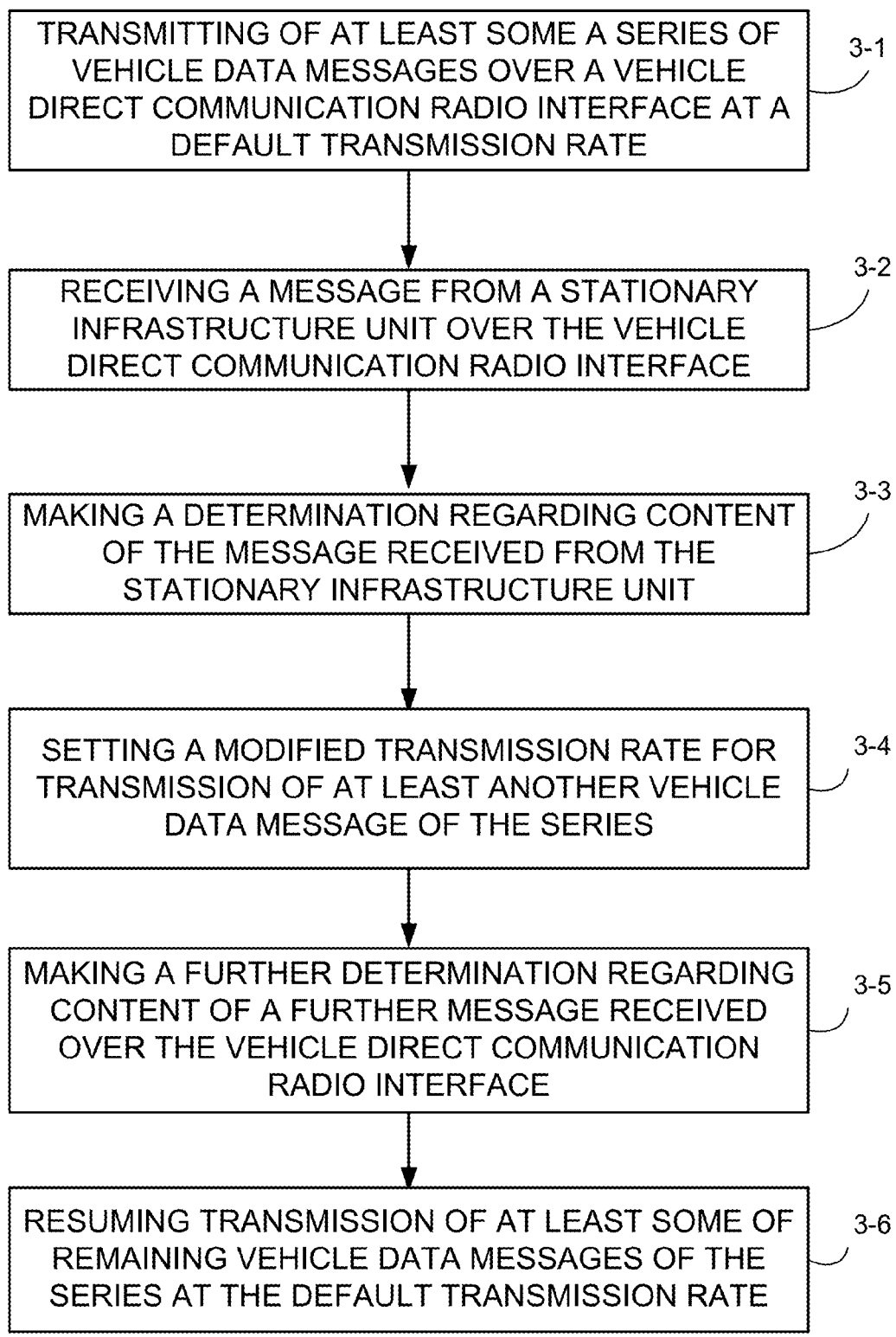
FIG. 3B is a flowchart depicting basic, example acts or steps involved in another example mode of a method of operating a wireless terminal which controls transmission rate of vehicle data objects (VDOs).

FIG. 3B shows example acts or steps executed by wireless terminal 40 in accordance with another example embodiment and mode. The mode of FIG. 3B includes act 3-1 through and including act 3-4 as well as additional act 3-5 and 3-6. The method of FIG. 3B shows what may happen when the wireless terminal 40 of train 20 no longer receives RDOs 56 from stationary infrastructure unit 30 that include an identifier of train 20. That is, judging from the content of a received RDO 56, the stationary infrastructure unit 30 is no longer either receiving or retransmitting vehicle data objects (VDOs) 52, either in whole or in part. Under such circumstances, the wireless terminal 40 likely should not continue transmission of the vehicle data objects (VDOs) 52 at the modified rate, but should increase the transmission rate and preferably should resume transmission of its vehicle data objects (VDOs) 52 at the default transmission rate. Thus, as shown in FIG. 3B, after setting the modified transmission rate (act 3-4), as act 3-5 the wireless terminal 40 makes a further determination regarding content of a further message received over the vehicle (V2X) communication radio interface from the stationary infrastructure unit. In accordance with the further determination of act 3-5, as act 3-6 the method of FIG. 3B further comprises increasing the rate of transmission (e.g., resuming transmission at the default transmission rate) of at least some of remaining vehicle data messages of the series.

FIG. 2 shows an example embodiment of wireless terminal 40 which controls transmission rate of vehicle data objects (VDOs) in vehicle (V2X) communications, for example in the manner of FIG. 3A or FIG. 3B. In addition to the processor circuitry 42, wireless terminal 40 also comprises memory 60 (e.g., memory circuitry) which may store an operating system and various application programs, such as vehicle (V2X) communication applications 44 (including V2I application 46) discussed above. The memory 60 may be any suitable type of memory, e.g., random access memory (RAM), read only memory (ROM), cache memory, processor register memory, or any combination of one or more memory types. The applications such as V2I application 46 comprise instructions executable by processor circuitry 42 and are stored in non-transient portions of memory 60. Other vehicle (V2X) communication applications 44 may include V2V (vehicle-to-vehicle) application 47 and V2P (vehicle-to-pedestrian) application 48.

The wireless terminal 40 also includes transceiver circuitry 62. The transceiver circuitry 62 in turn comprises transmitter circuitry 64 and receiver circuitry 66. The transceiver circuitry 62 includes antenna(e) for the wireless terminal 40. Transmitter circuitry 64 includes, e.g., a frame generator, amplifier(s), modulation circuitry and other conventional transmission equipment. Receiver circuitry 66 comprises, e.g., demodulation circuitry, a frame deformatter, and other conventional receiver equipment. The transceiver circuitry 62 is configured to use resources allocated for V2X communication, whether those resources be shared with sidelink direct (SLD) communications, resources of enhanced sidelink direct (SLD) communications, or resources separate and distinct for V2X communication as previously described.

The wireless terminal 40 further comprises user interface(s) 68. The user interfaces 68 may comprise one or more suitable input/output devices which are operable by a user. Some of all of the user interfaces 68 may be realized by a touch sensitive screen. Only a portion of the user interfaces 68 is depicted in FIG. 2, it being understood that the user interfaces 68 may be provided on a cover or case of wireless terminal 40 and thus may visibly obscure the underlying other components shown in FIG. 2.

In the example embodiment shown in FIG. 2, the processor circuitry 42 of wireless terminal 40 comprises VDO message generator 88; VDO message content 72; RDO message detector 74; VDO message rate controller 76; and VDO message trigger detector 78. The VDO message generator 88 generates the series 50 of vehicle data messages 52, using content information retrieved from VDO message content 72 for the vehicle data objects (VDOs) 52. The VDO message content 72 may comprise memory 60. The RDO message detector 74 detects a RDO 56 message received from stationary infrastructure unit 30. The VDO message rate controller 76 determines at what rate the vehicle data messages 52 should be transmitted, e.g., either at the default rate or a modified rate. The VDO message trigger detector 78 detects one or more "triggers" which initiate transmission of a series 50 of vehicle data messages 52.

Figure 4A:
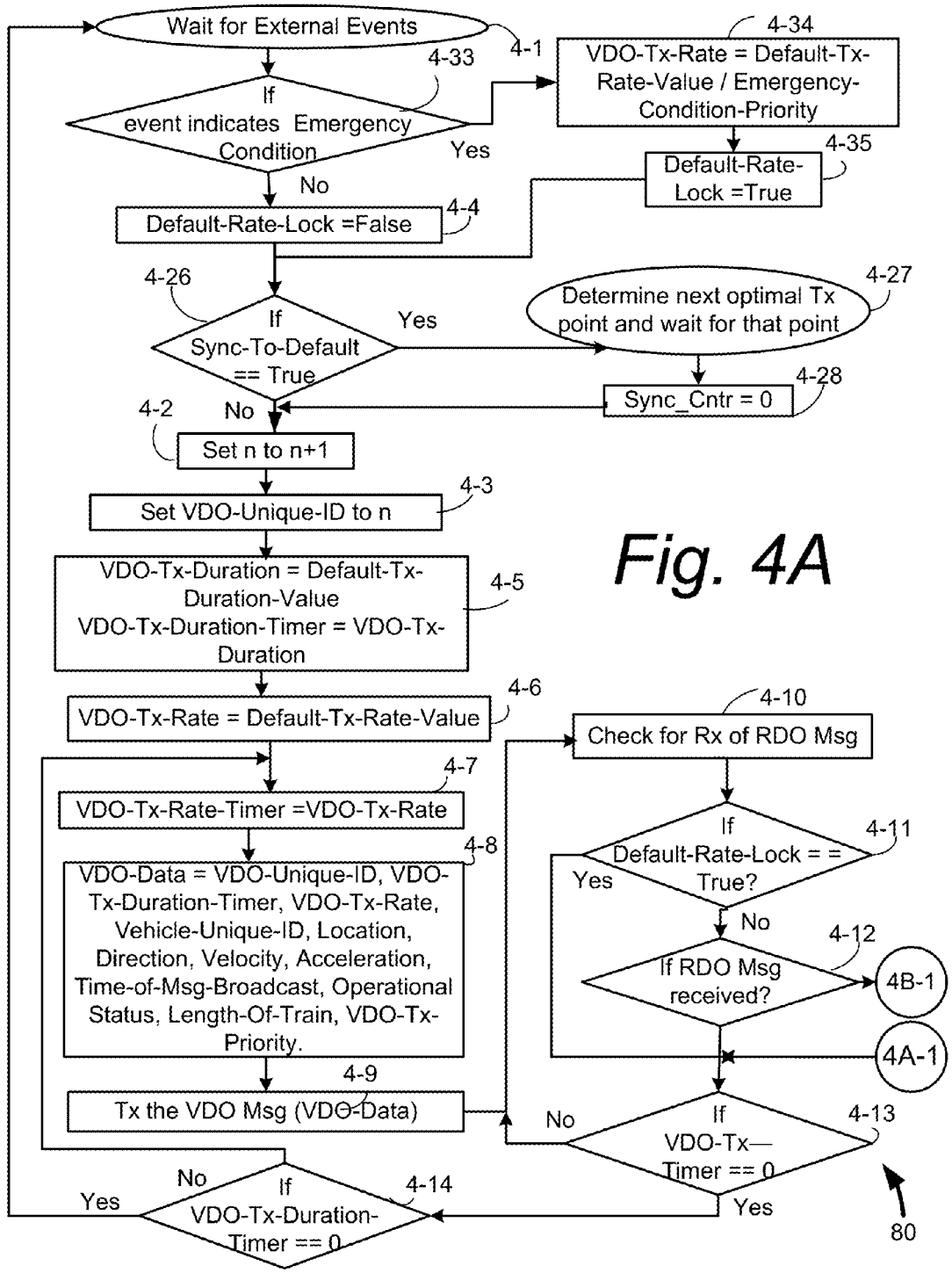
FIG. 4A-FIG. 4C is a flowchart showing in more detail a message rate control algorithm executed in an example embodiment and mode by processor circuitry for controlling transmission rate of vehicle data objects (VDOs).
Figure 4B:
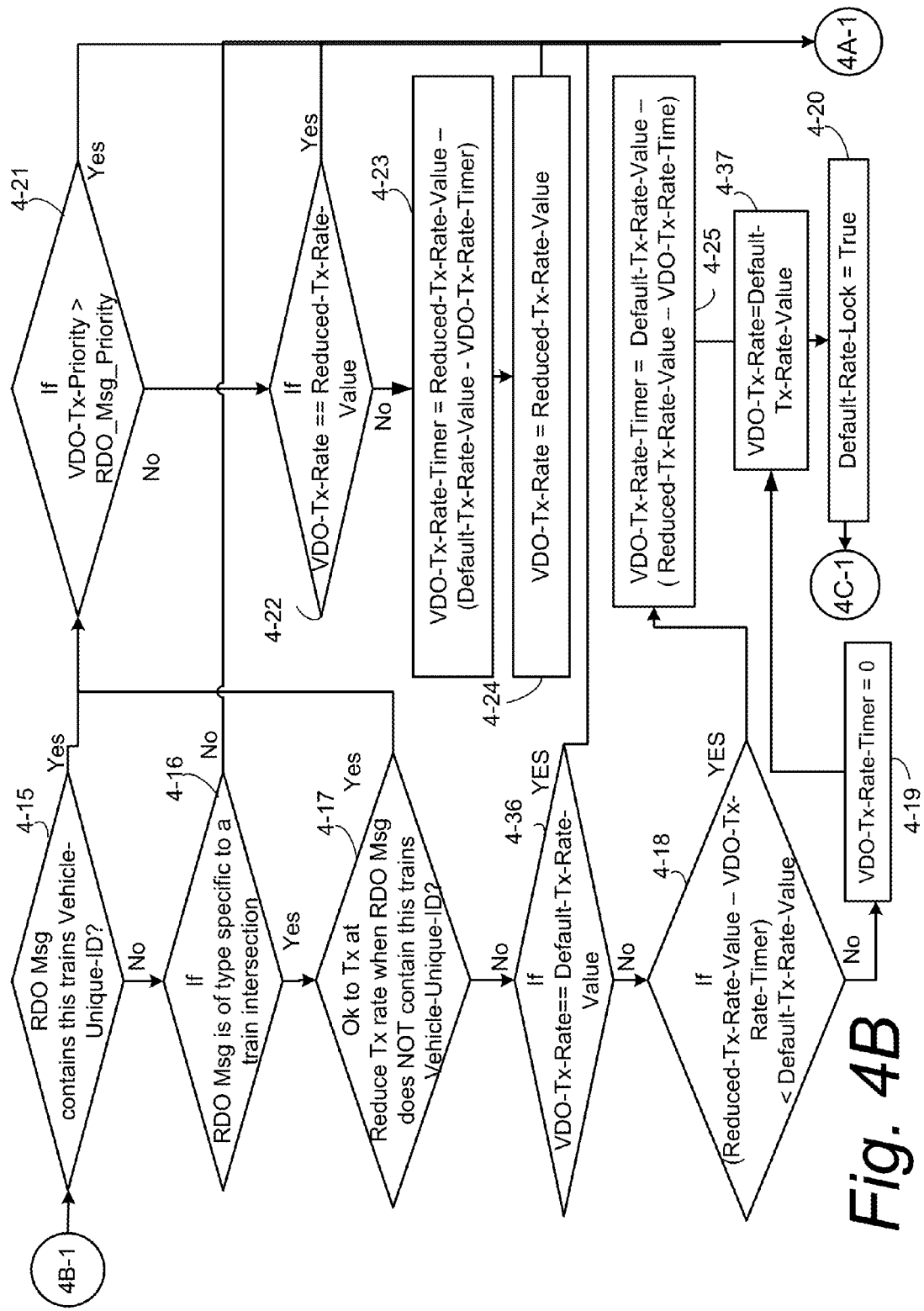
Figure 4C:
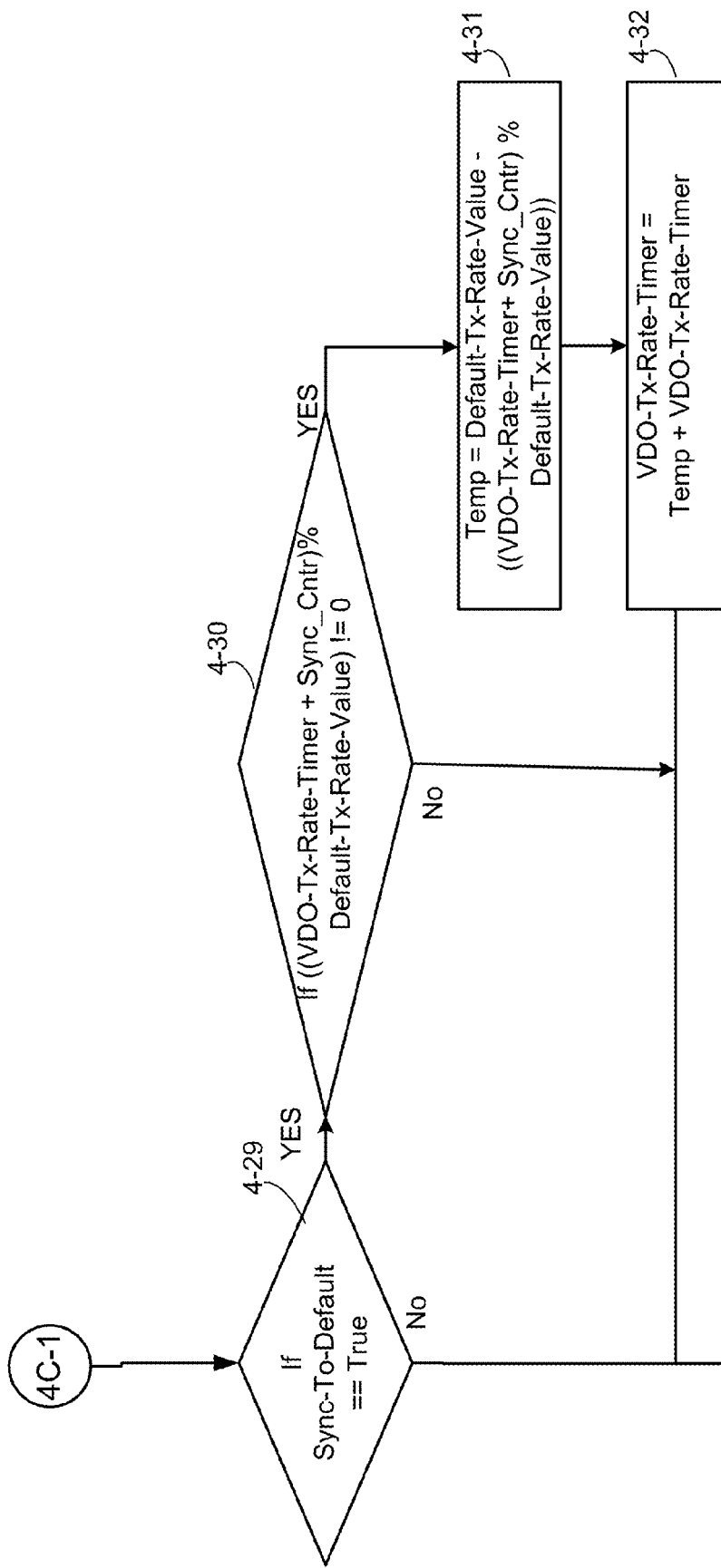

FIG. 4A, FIG. 4B, and FIG. 4C show in more detail an example embodiment and mode of a message rate control algorithm 80 executed by the processor circuitry 42 of wireless terminal 40 in accordance with an example method and mode. In an example embodiment and mode message rate control algorithm 80 is realized by execution (e.g., by processor circuitry 42) of coded instructions stored on non-transitory media, such as memory 60. The example acts or steps of message rate control algorithm 80 are labeled as acts 4-1 through 4-37. Order of appearance and/or execution of the acts of message rate control algorithm 80 are not necessarily sequential, as in some instances some acts may be grouped and/or numbered seemingly out of sequence as being related to a particular feature.

Execution of message rate control algorithm 80 begins by waiting at act 4-1 for an external or "triggering" event. The external or triggering event may be user and/or automated input as sensed by VDO message trigger detector 78. In the case of the mobile vehicle being a train 20, examples of external or trigger events include the sounding of a train horn (as sensed or automatically linked to horn activating mechanism), input (e.g., via user interfaces 68) from a human engineer, or some type of proximity detection to stationary infrastructure unit 30. Thus, the processor circuitry 42 is configured to initiate the series of vehicle data messages upon receipt of a message transmission trigger event.

After the message rate control algorithm 80 is initiated upon receipt of an external trigger, as act 4-4 the message rate control algorithm 80 sets a flag Default-Rate-Lock to "FALSE". If the flag Default-Rate-Lock were set to "TRUE", the VDO message rate controller 76 could not modify the transmission rate of the vehicle data objects (VDOs) 52 in a series. As explained herein, the flag Default-Rate-Lock may, under certain circumstances, eventually be set to "TRUE", but is not so set initially If an external event triggers a series 50 of vehicle data messages 52, the wireless terminal 40 needs some way of identifying or numbering the particular series. In the latter regard, wireless terminal 40 uses an identifier VDO-Unique-ID to identify a particular series of vehicle data objects (VDOs). As it name implies, the VDO-Unique-ID is unique for each series. Skipping for now acts between act 4-1 and act 4-2, at act 4-2 sets an integer counter n to n+1 (increments the integer counter) and then as act 4-3 sets the identifier VDO-Unique-ID equal to the counter n.

The wireless terminal 40 also needs some way of keeping track of long the series should be transmitted (e.g., a series duration), as well as other timing parameters. In this regard, VDO message rate controller 76 has access to various parameters, which may initially be preconfigured and thereafter modified as desired. Among these parameters are the following: Default_Tx_Duration_Value=a default value for the duration of transmission of a series; and Default_Tx_Rate_Value=a default value for the rate at which the vehicle data objects (VDOs) of a series is to be transmitted.

In the example embodiment and mode of FIG. 4A-FIG. 4C, the VDO message rate controller 76 uses a timer VDO-Tx_Duration_Counter to keep track of the time remaining in the duration window. At act 4-5 the timer VDO-Tx_Duration_Counter is initialized to the value of a parameter VDO-Tx_Duration, after the parameter VDO-Tx_Duration is (also at act 4-5) initialized to Default_Tx_Duration_Value. This way, as a result of act 4-5, the timer VDO-Tx_Duration_Counter is initialized at the default value. Thereafter, the timer VDO-Tx_Duration_Counter is decremented until it expires (as eventually checked at act 4-14).

The VDO message rate controller 76 uses a variable VDO-Tx-Rate as a current rate at which to transmit the vehicle data objects (VDOs) 52 of the series. At act 4-6 the parameter VDO-Tx-Rate is set to Default_Tx_Rate_Value, i.e., the default value for the rate at which the vehicle data objects (VDOs) of a series is to be transmitted. Then at act 4-7 a timer VDO-Tx-Rate_Timer is initialized at the value of the parameter VDO-Tx-Rate. The timer VDO-Tx-Rate_Timer is a count-down timer which is decremented by clock pulses. When the VDO-Tx-Rate_Timer expires (as checked at act 4-13), the VDO message rate controller 76 knows to send another vehicle data object (VDO) of the series.

As act 4-8 the VDO message generator 88 generates a vehicle data object (VDO) 52, using content obtained, e.g., from VDO message content 72. In an example embodiment and mode shown in FIG. 4A-FIG. 4C, a representative vehicle data object (VDO) 52 may include the following parameters (e.g., the "VDO-Data"): VDO-Unique-ID; VDO-Tx-Duration-Timer; VDO-Tx-Rate; Vehicle-Unique-ID; Location, DirectionVelocity; Acceleration; Time-of-Msg-Broadcast; Operational Status; Length-Of-Train; VDO-Tx-Priority. For each transmission of a VDO object, some aspects of the data contained therein may change as compared to the last transmission (e.g. the location is the most likely to change), and some will not change (e.g. the VDO-Unique-ID).

As act 4-9 the VDO message generator 88 prompts transmitter circuitry 64 to transmit a vehicle data object (VDO) 52, the "VDO message". The vehicle data object (VDO) 52 is transmitted over V2X communication radio interface 15 as part of the series 50 of vehicle data messages 52, and hopefully will be received by the stationary infrastructure communication unit (RSU) 36.

If stationary infrastructure communication unit (RSU) 36 receives a vehicle data object (VDO) 52 from train 20, the stationary infrastructure communication unit (RSU) 36 should retransmit the vehicle data object (VDO) 52, either in whole or in part as RDO 56 (see FIG. 1B). As explained herein, if stationary infrastructure communication unit (RSU) 36 is retransmitting some part or all of the vehicle data objects (VDOs) 52 as RDOs 56, then wireless terminal 40 on train 20 should not need to transmit as many vehicle data objects (VDOs) 52, and thereby may reduce traffic on V2X communication radio interface 15.

In the above regard, after transmission of the vehicle data object (VDO) 52, as act 4-10 the RDO message detector 74 seeks to detect if message has been received through receiver circuitry 66. After act 4-10 checks for the receipt of a message, as act 4-11 the message rate control algorithm 80 checks if the flag Default-Rate-Lock has been set to TRUE. If the flag Default-Rate-Lock has been set to TRUE, then there is no need to check if the received message would result in modification of the rate of transmission of the vehicle data objects (VDOs) 52, since the rate is locked. So if the check of act 4-11 is affirmative, execution jumps to act 4-13.

But if it is determined as act 4-11 that the flag Default-Rate-Lock is still FALSE, as act 4-12 the RDO message detector 74 checks the content of the received message to determine if it is an RDO 56 message. If the received message is not an RDO 56, processing then continues with act 4-13. Otherwise, processing continues with act 4-15 (which is reached on FIG. 4B through connector 4B-1).

If it is determined (at act 4-12) that a RDO 56 has been received, as act 4-15 of FIG. 4B the RDO message detector 74 checks to determine if the RDO 56 includes, either in whole or in part, a vehicle data object (VDO) 52 transmitted by train 20. In one example embodiment and mode, the RDO message detector 74 is configured to make a determination that the content of the message received from the stationary infrastructure unit (e.g., RDO 56) is a substantial retransmission of one of the vehicle data messages of the series by the stationary infrastructure communication unit (RSU) 36 of stationary infrastructure unit 30. In another example embodiment and mode, the RDO message detector 74 is configured to make a determination that the content of the message received from the stationary infrastructure unit comprises an identifier of the mobile vehicle that transmitted the vehicle data messages of the series (e.g., Vehicle-Unique-ID), or an identifier of the series 50 of vehicle data messages 52 (e.g., VDO-Unique_ID) transmitted by the wireless terminal 40 of the train 20.

Act 4-21 of FIG. 4B is executed if it is determined that the RDO 56 includes, either in whole or in part, a vehicle data object (VDO) 52 transmitted by train 20, e.g., an identifier of the train 20. Act 4-21 involves checking if the priority of the vehicle data object (VDO) 52 exceeds the priority of the received RDO 56. If the priority of the vehicle data object (VDO) 52 exceeds the priority of the received RDO 56, the received RDO 56 has no impact on the transmission rate of the series 50 of vehicle data messages 52, and thus processing jumps to act 4-13 (in FIG. 4A, reached through connector 4A-1). The priority of the vehicle data object (VDO) 52 may be preconfigured or stored at wireless terminal 40, and the priority of the received RDO 56 may be included in the received RDO 56 (e.g., as an additional field of a retransmitted vehicle data object (VDO) 52) or may be preconfigured or otherwise previously known to wireless terminal 40. For example, the wireless terminal 40 may have a mapping or listing of priorities for different stationary infrastructure units. Thus, by virtue of acts including act 4-21, the wireless terminal 40 is configured to set the modified transmission rate for transmission in dependence upon relative priority of the vehicle data messages and the message received from the stationary infrastructure unit.

If it is determined at act 4-21 that the priority of the vehicle data object (VDO) 52 exceeds the priority of the received RDO 56, act 4-22 checks if the transmission rate is already set to a modified transmission rate. In the particular embodiment illustrated in FIG. 4A-FIG. 4C, the modified transmission rate is a slower rate than the default transmission rate (e.g., Default-Tx-Rate-Value), and thus for sake of illustration bears the name Reduced-Tx-Rate-Value. In other example embodiments and modes the modified transmission rate may exceed the default transmission rate. Whatever its value, the modified transmission rate (e.g., Reduced-Tx-Rate-Value) may be preconfigured in memory or otherwise available to the processor circuitry 42. If the check of act 4-22 indicates that the transmission rate is already set to a modified transmission rate, execution jumps to act 4-13 in FIG. 4A (reached through page connector 4A-1).

If the transmission rate is not already set to a modified transmission rate, as act 4-24 the VDO message rate controller 76 sets the VDO-Tx-Rate equal to modified transmission rate (e.g., Reduced-Tx-Rate-Value). But just before doing so, as act 4-23 the VDO message rate controller 76 resets the timer VDO-Tx-Rate-Timer. In particular, as act 4-23 the VDO message rate controller 76 resets the timer VDO-Tx-Rate-Timer in accordance with Expression 1. Then after resetting the transmission rate at act 4-24 execution jumps to act 4-13 in FIG. 4A (reached through page connector 4A-1).

$$\text{VDO-Tx-Rate-Timer=Reduced-Tx-Rate-Value−(Default-Tx-Rate-Value−VDO-Tx-Rate-Timer)} \quad \text{Expression 1:}$$

If it had been determined as act 4-15 that the received RDO 56 did not contain information pertinent to a vehicle data object (VDO) 52 of train 20, e.g., did not contain an identifier of the intersection 22, then act 4-16 is next executed. Act 4-16 comprises checking if the received RDO 56 is even of a type which is specific to a stationary infrastructure unit 30, e.g., an intersection 22. If not, further processing of the RDO 56 is not necessary, and so execution jumps to act 4-13 in FIG. 4A (reached through page connector 4A-1).

If the received RDO 56 does pertain to a vehicle data object (VDO) 52 transmitted by the intersection 22 and does concern a train intersection 22, act 4-17 checks whether it is permitted to retain a modified transmission rate for the series 50 of vehicle data messages 52. That is, act 4-17 checks whether it is permitted to retain a modified transmission rate for the series 50 of vehicle data messages 52 in a situation in which the received RDO 56, which pertains to a train intersection 22, does not appear to retransmit or repeat content of a vehicle data object (VDO) 52 from train 20. If act 4-17 determines that it is permitted to retain a modified transmission rate for the series 50 of vehicle data messages 52, processing continues at previously described act 4-21. However, it if is not permitted to retain the modified transmission rate, act 4-36 is executed.

Act 4-36 comprises checking if VDO-Tx-Rate==Default-Tx-Rate-Value. The check of act 4-36 occurs since, if the VDO-Tx-Rate is already in the target rate, then there is no need to change the VDO-Tx-Rate-Timer. If the check of act 4-36 affirms that VDO-Tx-Rate==Default-Tx-Rate-Value, then execution continues with act 4-13 in FIG. 4A as indicated by the page connector 4A-1. Otherwise, act 4-18 is next executed.

Act 4-18 involves an evaluation of Expression 2.

$$\text{(Reduced-Tx-Rate-Value−VDO-Tx-Rate-Timer)<Default-Tx-Rate-Value} \quad \text{Expression 2:}$$

If Expression 2 is true, then as act 4-25 the value of VDO-Tx-Rate_Timer is set according to Expression 3. Otherwise, as act 4-19 the value of VDO-Tx-Rate-Timer is set to zero.

$$\text{VDO-Tx-Rate-Timer=Default-Tx-Rate-Value−(Reduced-Tx-Rate-Value−VDO-Tx-Rate-Time)} \quad \text{Expression 3:}$$

After the setting of the value of the VDO-Tx-Rate-Timer, either at act 4-25 or act 4-19, processing continues with act 4-37. At act 4-37 VDO-Tx-Rate=Default-Tx-Rate-Value. Thereafter, at act 4-20 the flag Default-Rate-Lock is set to TRUE. Setting the flag Default-Rate-Lock is set to TRUE at act 4-20 causes message rate control algorithm 80 (at act 4-11) to ignore any other RDOs received during the duration of the current series 50 of vehicle data messages 52.

After act 4-20 is performed, processing continues with act 4-29 on FIG. 4C (reached via page connector 4C-1). At act 4-29 the value of a flag SYNC-To-Default is checked. The flag SYNC-To-Default implements an optional feature of message rate control algorithm 80: enabling resumption of the default rate of VDO transmissions in a manner that is synchronous with a previous rate of VDO transmissions. As can be observed in FIG. 1A, for example, the vehicle data objects (VDOs) 52 of the series 50 of vehicle data messages 52 establish an initial default transmission pattern for the series. In an example embodiment and mode facilitated by the flag SYNC-To-Default, when returning from the modified rate to the default rate, the remaining vehicle data objects (VDOs) 52 of the series are transmitted not only at the default rate, but are synchronous with the initial default transmission pattern. In other words, suppose that it were possible for the wireless terminal 40 to engage in two parallel operations for the same time duration: (1) a first operation of transmitting a first set of vehicle data objects (VDOs) 52 throughout the duration of the series, and (2) a second operation wherein, at a first point in time in the duration transmit the vehicle data objects (VDOs) 52 are first switched from the default rate to the modified rate and then at second point in the duration return to the default rate. In accordance with the synchronism feature of message rate control algorithm 80, the vehicle data objects (VDOs) 52 which are returned to the default rate in the second operation would time-wise coincide with the default rate vehicle data objects (VDOs) 52 of the first operation. This is an illustration of what meant by reset the rate timer whereby transmission of at least some of the remaining vehicle data messages of the series is synchronized with a default transmission pattern for the series.

If the flag SYNC-To-Default is not TRUE, then the synchronization with initial default rate transmission pattern feature is not enabled, and execution jumps to act 4-13 in FIG. 4A (reached through page connector 4A-1). But if the flag SYNC-To-Default is TRUE, act 4-30 is performed. Act 4-30 comprises evaluating Expression 4.

$$\text{If((VDO-Tx-Rate-Timer+Sync\_Cntr)\% Default-Tx-Rate-Value)!=0} \quad \text{Expression 4:}$$

If Expression 4 is not true, then execution jumps to act 4-13 in FIG. 4A (reached through page connector 4A-1). But if Expression 4 is true, as act 4-31 a value Temp is computed by Expression 5 and as act 4-32 the VDO-Tx-Rate-Timer is set to the value of Expression 6.

$$\text{Temp=Default-Tx-Rate-Value−((VDO-Tx-Rate-Timer+Sync\_Cntr)\% Default-Tx-Rate-Value))} \quad \text{Expression 5:}$$

$$\text{VDO-Tx-Rate-Timer=Temp+VDO-Tx-Rate-Timer} \quad \text{Expression 6:}$$

In the foregoing operation, the value of VDO-Tx_Rate-Timer may be altered at act 4-23 (using Expression 1) or at act 4-25 (using Expression 3).

Rather than just reset the timer VDO-Tx-Rate-Timer to the modified rate value at act 4-23 (which can be done in an example alternate embodiment), or rather than just reset the timer VDO-Tx-Rate-Timer to the default value Default-Tx-Rate-Value at act 4-25 (which can also be done in an example alternate embodiment), both act 4-23 and act 4-25 more desirably determine how much time has elapsed since the last timer expiration, and then take that elapsed time value in to account for setting the timer VDO-Tx-Rate-Timer. This is advantageous, for example, in returning to the default rate, such that the next timer expiration will be exactly at the default period. Such is illustrated in FIG. 5A-FIG. 5D, discussed below. If the elapsed time of VDO-Tx-Rate-Timer since the last expire is greater than default rate, then the VDO-Tx-Rate-Timer is just set to zero for immediate expiration (act 4-19).

There are aspects to consider when managing the timer VDO-Tx-Rate-Timer. A first aspect is that the effective duration of the timer VDO-Tx-Rate-Timer should not exceed the Reduced-Tx-Rate-Value. Thus at act 4-23, the actual value loaded into the timer VDO-Tx-Rate-Timer must take into account the amount of time that has elapsed since the last programming of the timer.

A second aspect of timer management is that the effective duration of the timer VDO-Tx-Rate-Timer should not be less the Default-Tx-Rate-Value. Thus at both at 4-18 and act 4-25, the actual value loaded into the timer VDO-Tx-Rate-Timer must take into account the amount of time that has elapsed since the last programming of the timer VDO-Tx-Rate-Timer.

A third aspect of timer management is that upon a transition from modified rate (e.g., reduced rate) to default rate, the time may have already surpassed the default rate. Thus act 4-18 and act 4-19 serve to set the timer VDO-Tx-Rate-Timer directly to zero.

It was mentioned above that with a return to default synchronization feature the message rate control algorithm 80 may resume a higher rate of VDO transmissions that is synchronous with a previous higher rate of VDO transmissions. FIG. 5A, FIG. 5B, FIG. 5C, and FIG. 5D illustrate various scenarios of changing the value of the VDO-Tx-Rate-Timer, each scenario showing a first change at act 4-23 and then another or second change occurring in conjunction with act 4-18 and act 4-25.

Figure 5A:
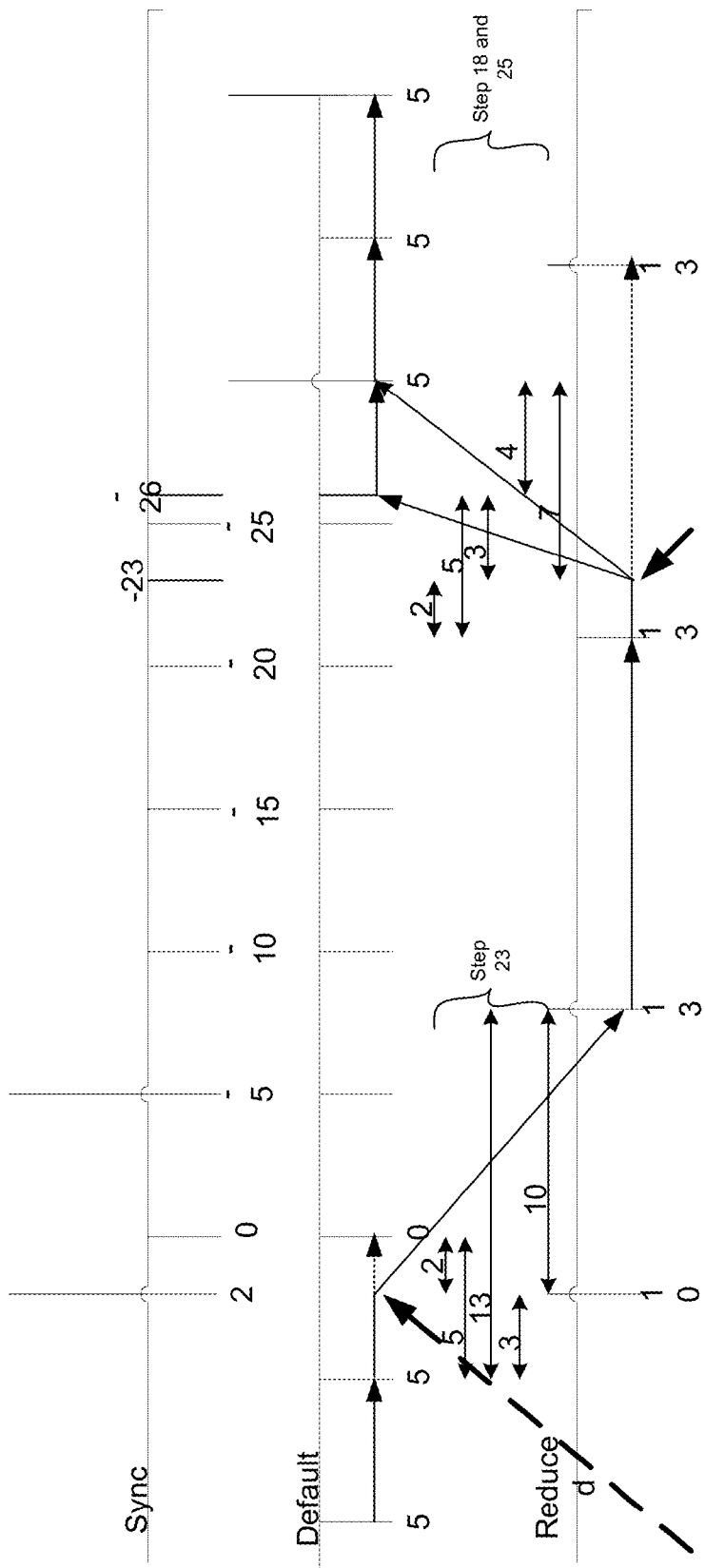

Table A-1 explains how in the scenario of FIG. 5A a first change occurs for the value of the VDO-Tx-Rate-Timer (also known as "Tmr") at act 4-23 by evaluation of Expression 1 (Expression 1 is shown in Table A-1 to be simplified as "R-(D-Tmr)"). Table A-2 explains how Expression 2 of act 4-18 (simplified in Table A-2 as "If(R-Tmr)<D") is evaluated in the scenario of FIG. 5A, how Expression 3 of act 4-25 (simplified in Table A-2 as "Tmr=D-(R-Tmr)") is evaluated for the scenario of FIG. 5A; how Expression 4 of act 4-30 (simplified in Table A-2 as "If(Tmr+Temp)% D)!=0") is evaluated in the scenario of FIG. 5A; how Expression 5 of act 4-31 (simplified in Table A-2 as "Temp=D-((Tmr+Temp)% D)") is evaluated in the scenario of FIG. 5A; and how of act 4-32 (simplified in Table A-2 as "Tmr=Tmr+Temp") is evaluated in the scenario of FIG. 5A. Both Table A-1 and Table A-2 show that for the scenario of FIG. 5A the default value D=5 and the modified value R=13.

TABLE A-1

```
TABLE A-1
@ Step 23
Tmr = 2
Sync = Tmr
D = 5
R = 13
Tmr = R - (D - Tmr)
Tmr = R - (5 - 2)
   10 = 13 - 3
```

TABLE A-2

```
@ Step 18
Tmr = 11
D = 5
R = 13
If ((R - Tmr) < D)
   ((13 - 11) < 5 )
      (2 < 5)
      Tmr = D - (R - Tmr)
      Tmr = 5 - (13 - 11)
      Tmr = 3
Else
   Tmr = 0
Temp = Sync
Temp = 23
If ((Tmr + Temp ) % D) != 0
   ((3 + 23 ) % 5) != 0
      1 != 0
```

TABLE A-2-continued

```
      Temp = D - ((Tmr + Temp ) % D)
      Temp = 5 - (( 3 + 23 ) % 5)
      Temp = 5 - ( 1)
      Temp = 4
      Tmr = Tmr + Temp
      Tmr = 3 + 4
      Tmr = 7
Else
   Done
```

Table B-1 explains how in the scenario of FIG. 5B a first change occurs for the value of the VDO-Tx-Rate-Timer (also known as "Tmr") at act 4-23 by evaluation of Expression 1 (Expression 1 is shown in Table B-1 to be simplified as "R-(D-Tmr)"). Table B-2 explains how Expression 2 of act 4-18 (simplified in Table B-2 as "If(R-Tmr)<D") is evaluated in the scenario of FIG. 5B, how Expression 3 of act 4-25 (simplified in Table B-2 as "Tmr=D-(R-Tmr)") is evaluated for the scenario of FIG. 5B; how Expression 4 of act 4-30 (simplified in Table B-2 as "If(Tmr+Temp)% D)!=0") is evaluated in the scenario of FIG. 5B; how Expression 5 of act 4-31 (simplified in Table B-2 as "Temp=D-((Tmr+Temp)% D)") is evaluated in the scenario of FIG. 5B; and how of act 4-32 (simplified in Table B-2 as "Tmr=Tmr+Temp") is evaluated in the scenario of FIG. 5B. Both Table B-1 and Table B-2 show that for the scenario of FIG. 5B the default value D=5 and the modified value R=13.

TABLE B-1

```
@ Step 23
Tmr = 2
Sync = Tmr
D = 5
R = 13
Tmr = R - (D - Tmr)
Tmr = R - (5 - 2)
   10 = 13 - 3
```

TABLE B-2

```
@ Step 18
Tmr = 8
D = 5
R = 13
If ((R - Tmr) < D)
   ((13 - 08 ) < 5 )
      (5 < 5)
      Tmr = D - (R - Tmr)
Else
   Tmr = 0
Temp = Sync
Temp = 26
If ((Tmr + Temp) % D) != 0
   (( 0 + 26 ) % 5) != 0
      1 != 0
      Temp = D - ((Tmr + Temp ) % D)
      Temp = 5 - (( 0 + 26 ) % 5)
      Temp = 5 - ( 1)
      Temp = 4
      Tmr = Tmr + Temp
      Tmr = 0 + 4
      Tmr = 4
Else
   Done
```

Table C-1 explains how in the scenario of FIG. 5C a first change occurs for the value of the VDO-Tx-Rate-Timer (also known as "Tmr") at act 4-23 by evaluation of Expression 1 (Expression 1 is shown in Table C-1 to be simplified as "R-(D-Tmr)"). Table C-2 explains how Expression 2 of act 4-18 (simplified in Table C-2 as "If(R-Tmr)<D") is evaluated in the scenario of FIG. 5C, how Expression 3 of act 4-25 (simplified in Table C-2 as "Tmr=D-(R-Tmr)") is evaluated for the scenario of FIG. 5C; how Expression 4 of act 4-30 (simplified in Table C-2 as "If(Tmr+Temp)% D)!=0") is evaluated in the scenario of FIG. 5C; how Expression 5 of act 4-31 (simplified in Table C-2 as "Temp=D−((Tmr+Temp)% D)") is evaluated in the scenario of FIG. 5C; and how of act 4-32 (simplified in Table C-2 as "Tmr=Tmr+Temp") is evaluated in the scenario of FIG. 5C. Both Table C-1 and Table C-2 show that for the scenario of FIG. 5C the default value D=5 and the modified value R=13.

TABLE C-1

@ Step 23
Tmr = 2
Sync = Tmr
D = 5
R = 13
Tmr = R − (D − Tmr)
Tmr = R − (5 − 2)
  10 = 13 − 3

TABLE C-2

@ Step 18
Tmr = 4
D = 5
R = 13
If ((R − Tmr) < D)
  ((13 − 04 ) < 5)
    (9 < 5)
      Tmr = D − (R − Tmr)
Else
    Tmr = 0
Temp = Sync
Temp = 30
If ((Tmr +Temp ) % D) != 0
  (( 0 + 30 ) % 5) != 0
    0 ! = 0
      Temp = D − ((Tmr + Temp) % D)
      Tmr = Tmr + Temp
Else
    Done Table D-1 explains how in the scenario of FIG. 5D a first change occurs for the value of the VDO-Tx-Rate-Timer (also known as "Tmr") at act 4-23 by evaluation of Expression 1 (Expression 1 is shown in Table D-1 to be simplified as "R-(D-Tmr)"). Table D-2 explains how Expression 2 of act 4-18 (simplified in Table D-2 as "If(R−Tmr)<D") is evaluated in the scenario of FIG. 5D, how Expression 3 of act 4-25 (simplified in Table D-2 as "Tmr=D-(R−Tmr)") is evaluated for the scenario of FIG. 5D; how Expression 4 of act 4-30 (simplified in Table D-2 as "If(Tmr+Temp)%!=0") is evaluated in the scenario of FIG. 5D; how Expression 5 of act 4-31 (simplified in Table D-2 as "Temp=D−((Tmr+Temp)% D)") is evaluated in the scenario of FIG. 5D; and how of act 4-32 (simplified in Table D-2 as "Tmr=Tmr+Temp") is evaluated in the scenario of FIG. 5D. Both Table D-1 and Table D-2 show that for the scenario of FIG. 5D the default value D=5 and the modified value R=13.

TABLE D-1

@ Step 23
Tmr = 2
Sync = Tmr
D = 5
R = 13

TABLE D-1-continued

Tmr = R − (D − Tmr)
Tmr = R − (5 − 2)
  10 = 13 − 3

TABLE D-2

@ Step 18
Tmr = 2
D = 5
R = 13
If ((R − Tmr) < D)
  ((13 − 02 ) < 5 )
      (11 < 5)
      Tmr = D − (R − Tmr)
Else
    Tmr = 0
Temp = Sync
Temp = 32
If ((Tmr + Temp ) % D) != 0
  (( 0 + 32 ) % 5) != 0
    2 ! = 0
      Temp = D − ((Tmr + Temp ) % D)
      Temp = 5 − (( 0 + 32 ) % 5)
      Temp = 5 − ( 2)
      Temp = 3
      Tmr = Tmr + Temp
      Tmr = 0 + 3
      Tmr = 3
Else
    Done From the foregoing it will be understood with reference to acts of FIG. 4A-FIG. 4C and elsewhere that, in an example embodiment and mode, the processor circuitry 42 establishes a duration window for the series of vehicle data messages (e.g., having a value VDO-Tx_Duration [see, e.g., act 4-5]). The processor circuitry 42 also maintains a rate timer (e.g., VDO-Tx-Rate_Timer [see, e.g., act 4-6 and act 4-7]) which times out when a vehicle data message of the series is to be transmitted [e.g., transmitted at act 4-9]. At the beginning of the duration window the processor circuitry 42 sets the rate timer at the default transmission rate [see, e.g., act 4-6 followed by act 4-7]. Then, in accordance with a determination [e.g., of act 4-15] regarding content of the message received from the stationary infrastructure unit, the processor circuitry 42 sets the rate timer at the modified transmission rate [as occurs, e.g., at act 4-24]. In accordance with a further determination regarding content of a further message received over the vehicle (V2X) communication radio interface [e.g., the determination of act 4-15 concerning a received RDO 56 which does not include, e.g., an identifier of the train 20], the processor circuitry 42 resumes transmission of at least some of the remaining vehicle data messages of the series at a higher rate, e.g., at the default transmission rate.

Various parameters utilized by the processor circuitry 42 in executing the message rate control algorithm 80 may be pre-configured in memory 60 at the time of manufacture or installation, and/or subsequently reconfigured at the time the wireless terminal 40 is provisioned. Moreover, some or all of the parameters may be dynamically changed via OTA commands sent to wireless terminal 40. Some example values of parameters are as follows: Default-Tx-Duration-Value: 1 min; Default-Tx-Rate-Value: 10 ms; Reduced-Tx-Rate-Value: 100 ms; and VDO-Tx-Priority-Configuration: [High, med, low, none].

In some example embodiments the "timers" are essentially "down counters". In such embodiments once a timer is set with a value, the timer will auto decrement at some fixed rate until the timer reaches zero, and then remain at zero until it is re-set with a new value. The message rate control algorithm 80 may from time-to-time interrogate the timer to determine if it has reached zero. When a timer reaches zero it may also generate an event that is passed to and subsequently queued by an algorithm. An algorithm may consider queued events at some later time, such as in act 4-1. In other embodiments, other types of timers may be utilized.

It was observed in conjunction with act 4-17 that receipt of a RDO 56 which is not a retransmission of a vehicle data object (VDO) 52 may nevertheless justify a modified transmission rate. A stationary infrastructure communication unit (RSU) 36 that is located at an intersection may be broadcasting generic information about the presence of that intersection (either continuously or triggered by some other mechanism that detects the approach of the train). Thus there is some "generic" information being broadcast by the RSU about the intersection. This generic information is transported on the vehicle direction communication resources, so it may be that the generic information is considered sufficient to warn/inform other V2V devices of the presence of the intersection. Thus in some situations the vehicle data objects (VDOs) 52 from train 20 can be transmitted at a lower rate to conserve the shared resources.

It may be possible that train 20 is approaching two relatively close (but not identical) consecutive intersections (RSUs), and the first RSU (the RSU nearest the train) rebroadcasts the vehicle data object (VDO) 52 of the train, a RDO 56 in the form of a rebroadcasted VDO is detected by the train, and the train accordingly slows the rate of transmission before the 2nd RSU receives the train's vehicle data object (VDO) 52 from the train 20 itself. However, the second RSU is probably receiving a rebroadcast of the vehicle data object (VDO) 52 of the train 20 from the first RSU before it receives the broadcast (at a reduced rate) directly from the train.

It has been mentioned above that the modified transmission rate may be a rate which is reduced (slower than) the default transmission rate. Such is not always the case, however, as there may be situations in which the modified rate is faster than the default rate. For example, in an emergency situation the wireless terminal 40 may wish to generate vehicle data objects (VDOs) 52 at a rate faster than the default rate. To cater to this possibility, the message rate control algorithm 80 may have an optional feature of checking at act 4-33 if the external event detected at act 4-1 is an emergency event. If an emergency event is detected at act 4-33, as act 4-34 the message rate control algorithm 80 sets the rate at a faster rate in accordance with Expression 7. In essence, Expression divides the default rate (Default-Tx-Rate-Value) by an integer Emergency-Condition-Priority. Then as act 4-35 the message rate control algorithm 80 locks the transmission rate (by setting flag Default-Rate-Lock to TRUE) so that at act 4-11 the receipt of incoming RDOs 56 will have no effect on the emergency transmission rate.

Since the transmission rate is dependent on the value loaded into the down counter VDO-Tx-Rate-Timer, the larger the value loaded in the down counter VDO-Tx-Rate-Timer, the slower will be the transmission rate. Conversely the smaller the value loaded into the down counter VDO-Tx-Rate-Timer, the faster the transmission rate.

As described above, when a train such as train 20 approaches, transits, and exits an intersection, the train's V2V device (e.g., wireless terminal 40) may be triggered to broadcast a series 50 of vehicle data messages 52. The trigger may be generated by an automated system on the train that monitors the relative location of the train and intersections along the track, or the trigger may be linked to the sounding of the horn which is manually activated by the train driver. Once the train's V2V device is triggered to broadcast the VDO, a continuous broadcasting of the VDO may be a waste of the shared transmission resources if a RSU is re-broadcasting the same or similar data. As described above, the resources utilized may be either sidelink direct resources, or other resources peculiar to vehicle (V2X) communications. Thus it is often desirable that a train's V2V device is able to regulate its VDO transmission rate when in the proximity of a RSU that is rebroadcasting the train's VDO. In example embodiments the train's V2V device has the capacity to receive a RDO from an RSU, and that if the train's V2V device determines that the received RDO contains a rebroadcasting of the train's VDO, then the train's V2V device may reduce the inter-VDO transmission rate as a means to reduce the use of shared system resources.

In addition, if the train's VDO inter transmission rate has been reduced by a receptions of a rebroadcast of its VDO from a first RSU, then it may resume its normal inter-VDO transmission rate when triggered by the train's approach to a second intersection that is not associated with the first RSU. If the train's V2V detects its VDO being re-broadcasted by the second RSU then it may again reduce the inter-VDO transmission rate as a means to reduce the use of shared system resources. And so on with subsequent RSU's.

In addition, if the train's V2V device is configured such that the VDO has a High Priority, the V2V device may determine to not reduce the inter-VDO transmission rate.

Figure 6A:
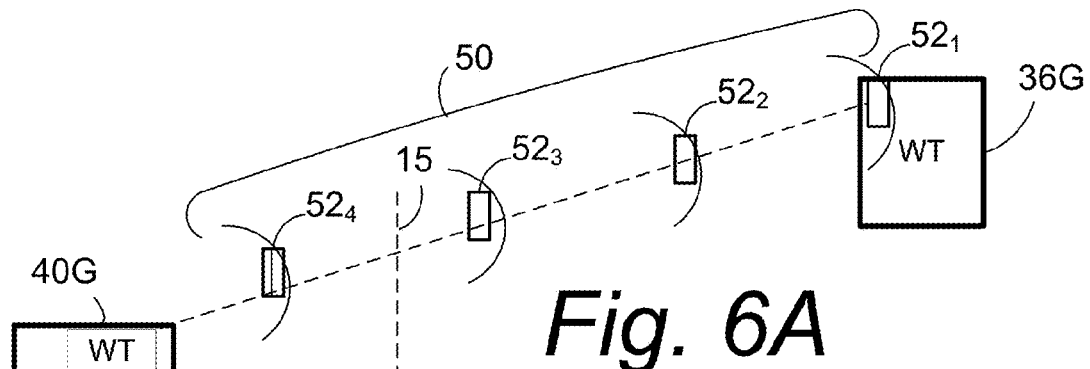
FIG. 6A-FIG. 6C are diagrammatic views corresponding to and showing applicability of the technology of FIG. 1A-FIG. 1C for vehicle (V2X) communication between a first representative generic mobile wireless terminal and a second representative generic wireless terminal unit.
Figure 6B:
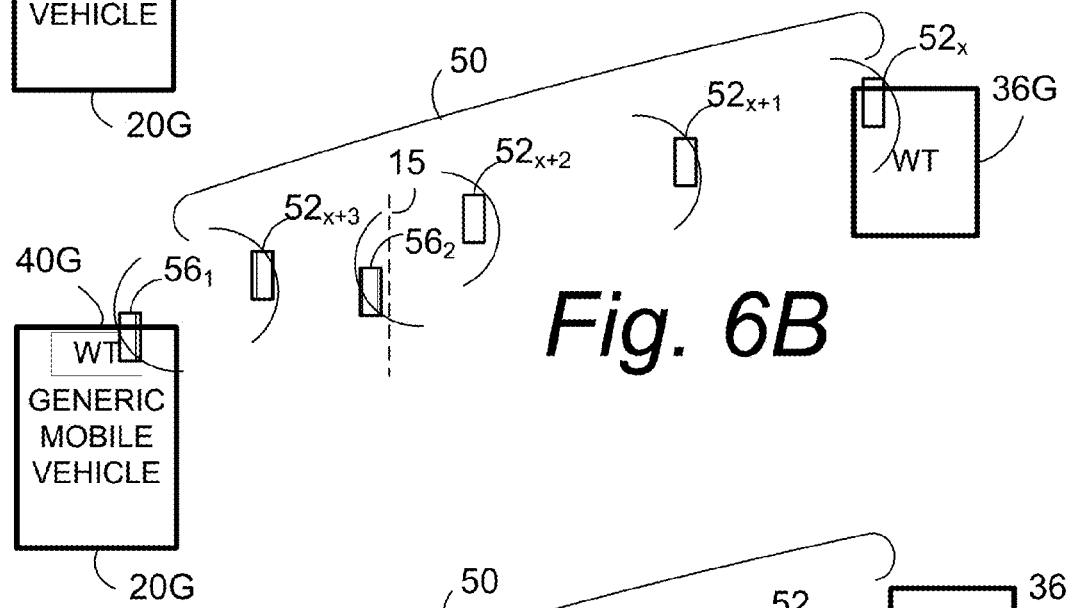
Figure 6C:
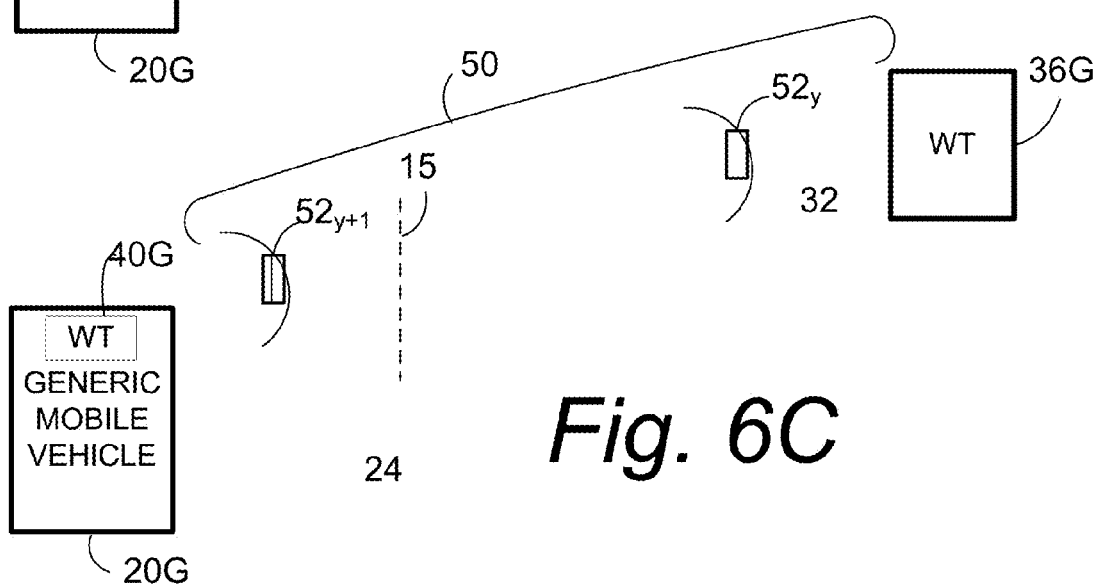

Although the technology disclosed herein is particularly illustrated to consider the case of collision avoidance between a train and automobile at a track and road intersection, the technology disclosed herein is also applicable for train and pedestrian, or train and bicycle, or indeed train and train, or any two other types of mobile vehicles. For example, FIG. 6A-FIG. 6C are diagrammatic views corresponding to and showing applicability of the technology of FIG. 1A-FIG. 1C for vehicle (V2X) communication between a wireless terminal 40G (a representative, generic wireless terminal) carried by or comprising first representative generic mobile vehicle 20G and a second representative generic wireless terminal unit 36G. The generic mobile vehicle 20G may be any type of vehicle, capable of travel on land, air, or water. The second representative generic wireless terminal unit 36G may be borne by or comprise a stationary structure for V2I communication (an example of which is illustrated in FIG. 1A-FIG. 1B), another vehicle for V2V communication, or a person/pedestrian for V2P communication. It will be understood that the same types of messages (e.g., data objects) are generated and transmitted by the generic wireless terminal 40G and the second representative generic wireless terminal unit 36G as are shown and above described above for wireless terminal 30 and terminal 36. As mentioned above, for the situations depicted by FIG. 6A-FIG. 6B a suitable one of the vehicle (V2X) communication applications 44 illustrated in FIG. 2 may be executed. For example, in contrast to FIG. 2, in situations in which comparable techniques are performed with respect to a non-stationary communicant, e.g., another vehicle or a pedestrian, the acts described herein may instead be performed upon execution of another of the vehicle (V2X) communication applications 44

Example features and advantages of the technology disclosed herein include but are not limited to the following:

A V2X device is able to determine that a RSU is rebroadcasting is VDO, and thus the V2V device is able to reduce its usage of shared system resources by reducing the rate of VDO transmissions.

A V2X device is able to resume a higher rate of VDO transmissions that is synchronous with a previous rate of VDO transmissions.

A V2X device is able to use configuration data to prioritize a higher rate of VDO transmission over a lower rate of VDO transmission.

A V2X device is able to use configuration data to override the requirement that the RDO message contain a retransmission of the VDO to trigger a lower rate of VDO transmissions.

A V2X device is able to remain in a lower rate of VDO transmissions when receiving a RDO from a first RSU that is rebroadcasting the VDO transmission, and receiving a second RDO that is not rebroadcasting the VDO transmission.

Figure 7:
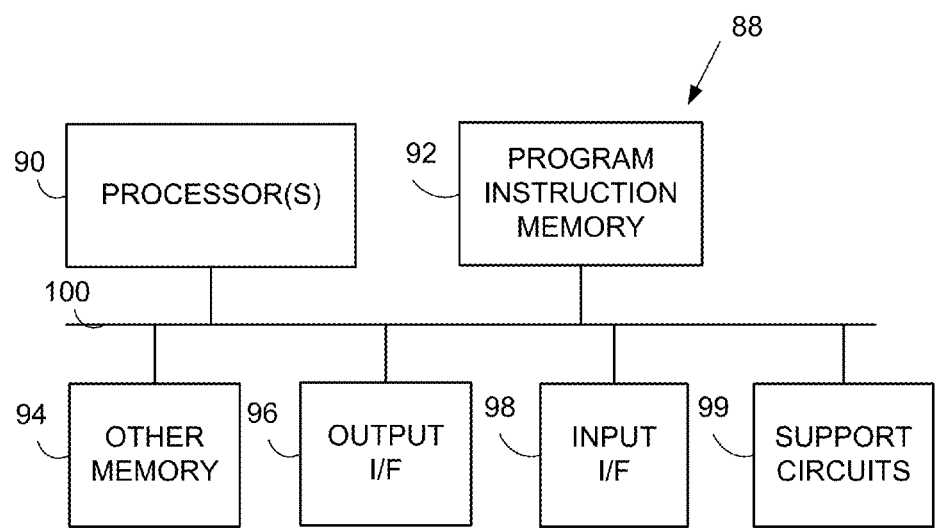
FIG. 7 is a diagrammatic view showing example elements comprising electronic machinery which may comprise a wireless terminal according to an example embodiment and mode.

Certain units and functionalities of wireless terminal 40 framed by broken line are, in an example embodiment, implemented by terminal electronic machinery 88. FIG. 7 shows an example of such electronic machinery 88 as comprising one or more processors 90, program instruction memory 92; other memory 94 (e.g., RAM, cache, etc.); input/output interfaces 96; peripheral interfaces 98; support circuits 99; and busses 100 for communication between the aforementioned units. The processor(s) 90 may comprise the processor circuitry 42, for example.

The memory 94, or computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory 60 shown in FIG. 2. The support circuits 99 are coupled to the processors 90 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein and message rate control algorithm 80 particularly may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 40 used in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the message rate control algorithm 80 described herein is a specific application that improves the functioning of the basic function (e.g., transmitting) of the wireless terminal 40 itself so that, for example, the wireless terminal 40 can operate more effectively by prudent use of radio resources.

Thus, as understood from the foregoing, in one of its aspects the technology disclosed herein concerns a wireless terminal configured for use in a mobile vehicle. The wireless terminal comprises a transmitter, a receiver, and processor circuitry. The transmitter is configured to transmit a series of vehicle data messages over a vehicle (V2X) communication radio interface. The receiver is configured to receive a message over the vehicle (V2X) communication radio interface. The processor circuitry is configured to: generate the vehicle data messages of the series; set a default transmission rate for transmission of at least some of the vehicle data messages of the series; make a determination regarding content of the received message received; and thereafter in accordance with the determination, set a modified transmission rate for transmission of at least another vehicle data message of the series and thereby modify utilization of the vehicle (V2X) communication radio interface.

In an example embodiment and mode the message is received from a stationary infrastructure unit.

In an example embodiment and mode the modified transmission rate is a slower rate than the default transmission rate.

In an example embodiment and mode the processor circuitry is configured to make a determination that the content of the received message is a substantial retransmission of one of the vehicle data messages of the series.

In an example embodiment and mode the processor circuitry is configured to make a determination that the content of the received message comprises an identifier of the mobile vehicle that transmitted the vehicle data messages of the series.

In an example embodiment and mode the processor circuitry is further configured, after setting the modified transmission rate, to make a further determination regarding content of a further message received over the vehicle (V2X) communication radio interface and, in accordance with the further determination, resuming transmission of at least some of remaining vehicle data messages of the series at the default transmission rate.

In an example embodiment and mode the processor circuitry is configured to initiate the series of vehicle data messages upon receipt of a message transmission trigger event.

In an example embodiment and mode the processor circuitry is configured to set the modified transmission rate for transmission in dependence upon relative priority of the vehicle data messages and the received message.

In an example embodiment and mode the processor circuitry is configured to set the modified transmission rate for transmission in dependence upon receipt of an indication of an emergency condition.

In an example embodiment and mode the processor is further configured to perform the acts of: establishing a duration window for the series of vehicle data messages; maintaining a rate timer which times out when a vehicle data message of the series is to be transmitted; at the beginning of the duration window setting the rate timer at the default transmission rate; in accordance with the determination, setting the rate timer at the modified transmission rate; in accordance with a further determination regarding content of a further message received over the vehicle (V2X) communication radio interface, resuming transmission of at least some of the remaining vehicle data messages of the series at the default transmission rate.

In an example embodiment and mode the processor is further configured, in accordance with the further determination, to reset the rate timer whereby transmission of at least some of the remaining vehicle data messages of the series is synchronized with a default transmission pattern for the series.

In an example embodiment and mode the mobile vehicle is a railway train and the message is received from a stationary infrastructure unit situated proximate an intersection of a train track and another traffic path.

In another of its aspects the technology disclosed herein concerns a method of operating a wireless terminal configured for use in a mobile vehicle. In a basic mode the method comprises: transmitting of at least some a series of vehicle data messages over a vehicle (V2X) communication radio interface at a default transmission rate; receiving a message over the vehicle (V2X) communication radio interface; making a determination regarding content of the received message; and thereafter in accordance with the determination, setting a modified transmission rate for transmission of at least another vehicle data message of the series and thereby modifying utilization of the vehicle (V2X) communication radio interface.

In an example embodiment and mode the method further comprises setting the modified transmission rate is a slower rate than the default transmission rate.

In an example embodiment and mode the act of making the determination comprises determining that the content of the received message is a substantial retransmission of one of the vehicle data messages of the series by the stationary infrastructure unit.

In an example embodiment and mode the act of making the determination comprises determining that the content of the received message comprises an identifier of the mobile vehicle that transmitted the vehicle data messages of the series.

In an example embodiment and mode the method further comprises: after setting the modified transmission rate, making a further determination regarding content of a further message received over the vehicle (V2X) communication radio interface; and, in accordance with the further determination, resuming transmission of at least some of remaining vehicle data messages of the series at the default transmission rate.

In an example embodiment and mode the method further comprises initiating the series of vehicle data messages upon receipt of a message transmission trigger event.

In an example embodiment and mode the method further comprises setting the modified transmission rate for transmission in dependence upon relative priority of the vehicle data messages and the message received from the stationary infrastructure unit.

In an example embodiment and mode the method further comprises setting the modified transmission rate for transmission in dependence upon receipt of an indication of an emergency condition.

In an example embodiment and mode the method further comprises: establishing a duration window for the series of vehicle data messages; maintaining a rate timer which times out when a vehicle data message of the series is to be transmitted; at the beginning of the duration window setting the rate timer at the default transmission rate; in accordance with the determination, setting the rate timer at the modified transmission rate; in accordance with a further determination regarding content of a further message received over the vehicle (V2X) communication radio interface, resuming transmission of at least some of the remaining vehicle data messages of the series at the default transmission rate.

In an example embodiment and mode the method further comprises: in accordance with the further determination, resetting the rate timer whereby transmission of at least some of the remaining vehicle data messages of the series is synchronized with a default transmission pattern for the series.

Example 3GPP documents possibly relevant to the foregoing include the following (all of which are incorporated herein by reference):
3GPP TR 22.885, "Technical Specifications Group Service and System Aspects; Study on LTE support for V2X services"
3GPP TR 22.891, "Feasibility Study on New Services and Markets Technology Enablers; Stage 1".

3GPP TR 22.861, "Feasibility Study on New Services and Markets Technology Enablers for Massive Internet of Things; Stage 1".

3GPP TR 22.862, "Feasibility Study on New Services and Markets Technology Enablers—Critical Communications; Stage 1"

3GPP TR 22.863, "Feasibility Study on New Services and Markets Technology Enablers—Enhanced Mobile Broadband; Stage 1"

3GPP TR 22.864, "Feasibility Study on New Services and Markets Technology Enablers—Network Operation; Stage 1"

ProSe-enabled UEs that support V2V services are expected to support and use the SideLink protocol for the establishment of Direct Communications to other ProSe enabled devices that support V2X services.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A wireless terminal configured for use in a mobile vehicle comprising:
    a transmitter configured to transmit a series of vehicle data messages over a vehicle (V2X) communication radio interface;
    a receiver configured to receive a message over the vehicle (V2X) communication radio interface;
    a processor configured to:
        generate the vehicle data messages of the series;
        set a default transmission rate for transmission of at least some of the vehicle data messages of the series;
        make a determination regarding content of the received message; and thereafter
        in accordance with the determination, set a modified transmission rate for transmission of at least another vehicle data message of the series and thereby modify utilization of the vehicle (V2X) communication radio interface.

2. The wireless terminal of claim 1, wherein the modified transmission rate is a slower rate than the default transmission rate.

3. The wireless terminal of claim 1, wherein the processor is configured to make a determination that the content of the received message is a substantial retransmission of one of the vehicle data messages of the series.

4. The wireless terminal of claim 1, wherein the processor is configured to make a determination that the content of the received message comprises an identifier of the mobile vehicle that transmitted the vehicle data messages of the series.

5. The wireless terminal of claim 1, wherein the processor is further configured, after setting the modified transmission rate, to make a further determination regarding content of a further message received over the vehicle (V2X) communication radio interface and, in accordance with the further determination, resuming transmission of at least some of remaining vehicle data messages of the series at the default transmission rate.

6. The wireless terminal of claim 1, wherein the processor is configured to initiate the series of vehicle data messages upon receipt of a message transmission trigger event.

7. The wireless terminal of claim 1, wherein the processor is configured to set the modified transmission rate for transmission in dependence upon relative priority of the vehicle data messages and the received message.

8. The wireless terminal of claim 1, wherein the processor is configured to set the modified transmission rate for transmission in dependence upon receipt of an indication of an emergency condition.

9. The wireless terminal of claim 1, wherein the processor is further configured to perform the acts of:
    establishing a duration window for the series of vehicle data messages;
    maintaining a rate timer which times out when a vehicle data message of the series is to be transmitted;
    at the beginning of the duration window setting the rate timer at the default default transmission rate;
    in accordance with the determination, setting the rate timer at the modified transmission rate;
    in accordance with a further determination regarding content of a further message received over the vehicle (V2X) communication radio interface, resuming transmission of at least some of the remaining vehicle data messages of the series at the default transmission rate.

10. The wireless terminal of claim 9, wherein the processor is further configured, in accordance with the further determination, to reset the rate timer whereby transmission of at least some of the remaining vehicle data messages of the series is synchronized with a default transmission pattern for the series.

11. The wireless terminal of claim 1, wherein the mobile vehicle is a railway train and the message is received from a stationary infrastructure unit situated proximate an intersection of a train track and another traffic path.

12. The wireless terminal of claim 1, wherein the message is received from a stationary infrastructure unit.

13. A method of operating a wireless terminal configured for use in a mobile vehicle, the method comprising:
    transmitting of at least some a series of vehicle data messages over a vehicle (V2X) communication radio interface at a default transmission rate;
    receiving a message over the vehicle (V2X) communication radio interface;
    making a determination regarding content of the received message; and thereafter
    in accordance with the determination, setting a modified transmission rate for transmission of at least another vehicle data message of the series and thereby modifying utilization of the vehicle (V2X) communication radio interface.

14. The method of claim 13, further comprising setting the modified transmission rate is a slower rate than the default transmission rate.

15. The method of claim 13, wherein making the determination comprises determining that the content of the received message is a substantial retransmission of one of the vehicle data messages of the series.

16. The method of claim 13, wherein making the determination comprises determining that the content of the received message comprises an identifier of the mobile vehicle that transmitted the vehicle data messages of the series.

17. The method of claim 13, further comprising:
after setting the modified transmission rate, making a further determination regarding content of a further message received over the vehicle (V2X) communication radio interface; and,
in accordance with the further determination, resuming transmission of at least some of remaining vehicle data messages of the series at the default transmission rate.

18. The method of claim 13, further comprising initiating the series of vehicle data messages upon receipt of a message transmission trigger event.

19. The method of claim 13, further comprising setting the modified transmission rate for transmission in dependence upon relative priority of the vehicle data messages and the received message.

20. The method of claim 13, further comprising setting the modified transmission rate for transmission in dependence upon receipt of an indication of an emergency condition.

21. The method of claim 13, further comprising:
maintaining a rate timer which times out when a vehicle data message of the series is to be transmitted;
at the beginning of the duration window setting the rate timer at the default default transmission rate;
in accordance with the determination, setting the rate timer at the modified transmission rate;
in accordance with a further determination regarding content of a further message received over the vehicle (V2X) communication radio interface, resuming transmission of at least some of the remaining vehicle data messages of the series at the default transmission rate.

22. The method of claim 20, further comprising, in accordance with the further determination, resetting the rate timer whereby transmission of at least some of the remaining vehicle data messages of the series is synchronized with a default transmission pattern for the series.

23. The method of claim 13, wherein the mobile vehicle is a railway train and the message is received from a stationary infrastructure unit situated proximate an intersection of a train track and another traffic path.

24. The method of claim 13, wherein the message is received from the stationary infrastructure unit.

* * * * *

UNITED STATES PATENT AND TRADEMARK OFFICE
CERTIFICATE OF CORRECTION

PATENT NO. : 9,844,059 B2
APPLICATION NO. : 15/468925
DATED : December 12, 2017
INVENTOR(S) : Park et al.

Page 1 of 1

It is certified that error appears in the above-identified patent and that said Letters Patent is hereby corrected as shown below:

In the Claims

In Column 30, Line 4, in Claim 21, after the first line, insert the following paragraph:
-- establishing a duration window for the series of vehicle data messages; --.

Signed and Sealed this
Twenty-fifth Day of September, 2018

Andrei Iancu
*Director of the United States Patent and Trademark Office*